United States Patent
Yuan et al.

(10) Patent No.: US 12,316,406 B2
(45) Date of Patent: May 27, 2025

(54) UPLINK PRE-CODING BASED WIRELESS COMMUNICATIONS

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Tao Luo, San Diego, CA (US); Xiaoxia Zhang, San Diego, CA (US); Jing Sun, San Diego, CA (US)

( * ) Notice: Subject to any disclaimer, the term of this patent is extended or adjusted under 35 U.S.C. 154(b) by 64 days.

(21) Appl. No.: 17/904,086

(22) PCT Filed: Feb. 20, 2021

(86) PCT No.: PCT/CN2021/077049
§ 371 (c)(1),
(2) Date: Aug. 11, 2022

(87) PCT Pub. No.: WO2021/164764
PCT Pub. Date: Aug. 26, 2021

(65) Prior Publication Data
US 2023/0132170 A1 Apr. 27, 2023

(30) Foreign Application Priority Data
Feb. 21, 2020 (WO) ............... PCT/CN2020/076160

(51) Int. Cl.
*H04B 7/0404* (2017.01)
*H04B 7/0417* (2017.01)
(Continued)

(52) U.S. Cl.
CPC ......... *H04B 7/0404* (2013.01); *H04B 7/0421* (2013.01); *H04B 7/0426* (2013.01); *H04L 5/0051* (2013.01)

(58) Field of Classification Search
CPC ...... H04B 7/04; H04B 7/0404; H04B 7/0413; H04B 7/0421; H04B 7/0426;
(Continued)

(56) References Cited

U.S. PATENT DOCUMENTS 9,755,810 B2  9/2017 Gaal et al.
11,509,364 B2  11/2022 Chakraborty et al.
(Continued)

FOREIGN PATENT DOCUMENTS

CN  104488210 A  4/2015
CN  108288986 A  7/2018
(Continued)

OTHER PUBLICATIONS

"Overview of Physical Layer Enhancements for NR URLLC", 3GPP Draft, 3GPP TSG RAN WG1 Meeting #94, R1-1809055 Overview of Physical Layer Enhancements for NR URLLC, 3rd Generation Partnership Project (3GPP), Mobile Competence Centre, 650, Route Des Lucioles, F-06921 Sophia-Antipolis CE, vol. RAN WG1, No. Gothenburg, Sweden, Aug. 11, 2018 (Aug. 11, 2018), XP051516425, 27 Pages, Retrieved from the Internet: URL: http://www.3gpp.org/ftp/tsg%5Fran/WG1%5FRL1/TSGR1%5F94/ Docs/R1%2D1809055%2Ezip [retrieved on Aug. 11, 2018].
(Continued)

*Primary Examiner* — Siu M Lee

(57) ABSTRACT

An apparatus for wireless communication includes a memory and one or more processors coupled to the memory. The one or more processors are configured to determine a plurality of pre-coders available for uplink transmissions and to select a particular pre-coder from among the plurality of pre-coders. The one or more processors are further configured to initiate encoding of an uplink signal based on the particular pre-coder to generate a pre-coded uplink signal. The pre-coded uplink signal has one or more char-
(Continued)

acteristics that enable a base station to identify the particular pre-coder. The one or more processors are further configured to initiate transmission of the pre-coded uplink signal.

29 Claims, 11 Drawing Sheets

(51) Int. Cl.
*H04B 7/0426* (2017.01)
*H04L 5/00* (2006.01)

(58) Field of Classification Search
CPC .. H04B 7/0456; H04B 7/0478; H04B 7/0482; H04L 5/0051
See application file for complete search history.

(56) References Cited

U.S. PATENT DOCUMENTS

| | | | |
|---|---|---|---|
| 2018/0183502 A1 | 6/2018 | Sandberg et al. | |
| 2020/0067663 A1* | 2/2020 | Liu | H04W 72/1268 |
| 2020/0204243 A1* | 6/2020 | Liu | H04W 72/563 |
| 2023/0379018 A1* | 11/2023 | Ren | H04W 72/23 |

FOREIGN PATENT DOCUMENTS

| | | |
|---|---|---|
| CN | 108809578 A | 11/2018 |
| EP | 3598676 A1 | 1/2020 |
| WO | WO-2014169091 | 10/2014 |
| WO | WO-2018169635 A2 | 9/2018 |
| WO | WO-2018205921 A1 | 11/2018 |
| WO | WO-2019051825 A1 | 3/2019 |
| WO | WO-2020020120 A1 | 1/2020 |

OTHER PUBLICATIONS

International Search Report and Written Opinion—PCT/CN2021/077049—ISA/EPO—May 19, 2021.
International Search Report and Written Opinion—PCT/CN2020/076160—ISA/EPO—Nov. 26, 2020.
"Codebook Based UL Transmission", 3GPP TSG RAN WG1 #90, R1-1713387, Aug. 21-25, 2017 Prague, Czech, Aug. 25, 2017(Aug. 25, 2017), pp. 1-4.
Supplementary European Search Report—EP21757439—Search Authority—Munich—Feb. 20, 2024.

* cited by examiner

UPLINK PRE-CODING BASED WIRELESS COMMUNICATIONS

CROSS-REFERENCE TO RELATED APPLICATION

This application claims the benefit of and priority to International Pat. App. No. PCT/CN2020/076160, entitled "UPLINK PRE-CODING RESOURCE GROUP (UPRG) BASED WIRELESS COMMUNICATIONS" and filed on Feb. 21, 2020, which is expressly incorporated by reference herein in its entirety.

TECHNICAL FIELD

Aspects of the present disclosure relate generally to wireless communication systems, and more particularly, to uplink pre-coding based wireless communications.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, an apparatus for wireless communication includes a memory and one or more processors coupled to the memory. The one or more processors are configured to determine a plurality of pre-coders available for uplink transmissions and to select a particular pre-coder from among the plurality of pre-coders. The one or more processors are configured to initiate encoding of an uplink signal based on the particular pre-coder to generate a pre-coded uplink signal and to initiate transmission of the pre-coded uplink signal. The pre-coded uplink signal has one or more characteristics that enable a base station to identify the particular pre-coder.

In some other aspects of the disclosure, a method of wireless communication performed by a user equipment (UE) includes determining a plurality of pre-coders available for uplink transmissions. The method further includes selecting a particular pre-coder from among the plurality of pre-coders, encoding an uplink signal based on the particular pre-coder to generate a pre-coded uplink signal, and transmitting the pre-coded uplink signal. The pre-coded uplink signal has one or more characteristics that enable a base station to identify the particular pre-coder.

In some other aspects of the disclosure, an apparatus for wireless communication includes a memory and one or more processors coupled to the memory. The one or more processors are configured to receive, from a UE, a pre-coded uplink signal. The one or more processors are further configured to identify, based on one or more characteristics of the pre-coded uplink signal and from a plurality of pre-coders associated with uplink transmissions, a particular pre-coder used to pre-code the uplink signal. The one or more processors are further configured to initiate decoding of the pre-coded uplink signal based on the particular pre-coder.

In some other aspects of the disclosure, a method of wireless communication performed by a base station includes receiving, from a UE, a pre-coded uplink signal. The method further includes, based on one or more characteristics of the pre-coded uplink signal, identifying, from a plurality of pre-coders associated with uplink transmissions, a particular pre-coder used to pre-code the uplink signal. The method further includes, based on the particular pre-coder, decoding the pre-coded uplink signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
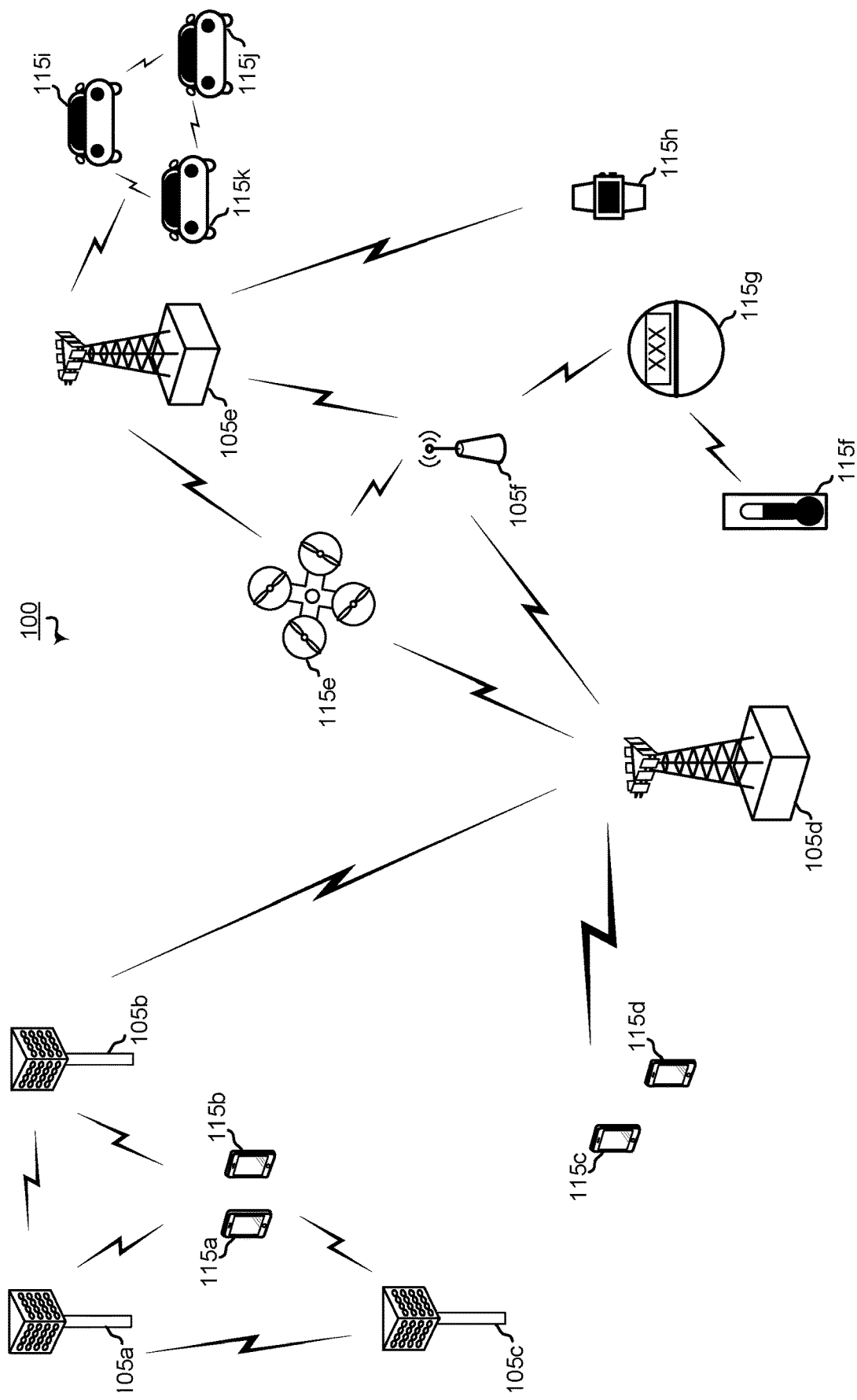
FIG. 1 is a block diagram illustrating details of a wireless communication system to perform uplink pre-coding resource group (UPRG) based wireless communications in accordance with some aspects of the disclosure.

A wireless communication system in accordance with some aspects of the disclosure may dynamically select an uplink pre-coding resource group (UPRG) bundle size and may perform frequency-selective pre-coding of information based on the UPRG bundle size. The UPRG bundle size may refer to a number of consecutive physical resource blocks (PRBs) of a bandwidth part (BWP) of a frequency or range of frequencies used for an uplink transmission. Different pre-coders may be used to pre-code different UPRGs of the uplink transmission based on the UPRG bundle size, resulting in frequency-selective pre-coding of information.

In one example, the UPRG bundle size can be increased to improve reliability or accuracy of a channel estimate. For example, by increasing the UPRG bundle size, a number of PRBs used for each channel estimation operation may be increased, thus increasing a "sample size" for a channel estimate. As a result, the channel estimate may be more reliable or accurate due to the increased UPRG bundle size. In one example, a wideband (WB) UPRG bundle size is selected to achieve a "maximum" channel estimate quality metric of a range of channel estimate quality metrics.

In another example, the UPRG bundle size can be decreased to improve pre-coding gain associated with one or more communications in the wireless communication system. For example, as the UPRG bundle size is decreased, a number of transitions is increased between pre-coders (e.g., from pre-coding using one pre-coder to pre-coding using another pre-coder, etc.). As a result, frequency selectivity of an uplink transmission can be increased, improving pre-coding gain associated with the uplink transmission. In some cases, increased pre-coding gain can improve reliability of an uplink transmission.

Thus, in accordance with some aspects of the disclosure, UPRG based communications increase reliability of uplink communications in a wireless communication system. For example, based on the particular channel conditions, particular device characteristics, or other parameters, a UPRG bundle size can be selected. The UPRG bundle size can be selected to achieve a "trade-off" between channel estimate quality and pre-coding gain. As a result, characteristics of uplink signals transmitted within the wireless communication system can be determined more accurately as compared to certain conventional techniques that avoid pre-coding of uplink signals or that pre-code uplink signals each using a common pre-coding technique.

In some implementations, a UE selects a particular pre-coder from among a plurality of pre-coders for an uplink transmission, such as a sounding reference signal (SRS), a physical uplink shared channel (PUSCH) signal, or both. The UE may transmit the uplink transmission to a base station and may implicitly indicate the particular pre-coder to the base station (e.g., without providing an explicit indication of the particular pre-coder to the base station). For example, the UE may selectively apply different power levels to the uplink transmission based on the particular pre-coder, such as by applying a first power level to values of the uplink transmission (e.g., a first UPRG) that are pre-coded based on a first bit value (e.g., "1" or "0") of the particular pre-coder and by applying a second power level different than the first power level to values of the uplink transmission (e.g., a second UPRG) that pre-coded based on a second bit value (e.g., "0" or "1") of the particular pre-coder. Upon receiving the pre-coded uplink transmission, the base station may identify the particular pre-coder based on the power levels applied to the uplink transmission and may decode the pre-coded uplink transmission based on the particular pre-coder.

By implicitly indicating the particular pre-coder to the base station, the UE and the base station may reduce or avoid transmission of messages that explicitly indicate the particular pre-coder. As a result, a number of transmitted messages may be reduced, which may increase resources available for other transmissions (such as data transmissions), reduce latency or interference, or a combination thereof.

To further illustrate, this disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
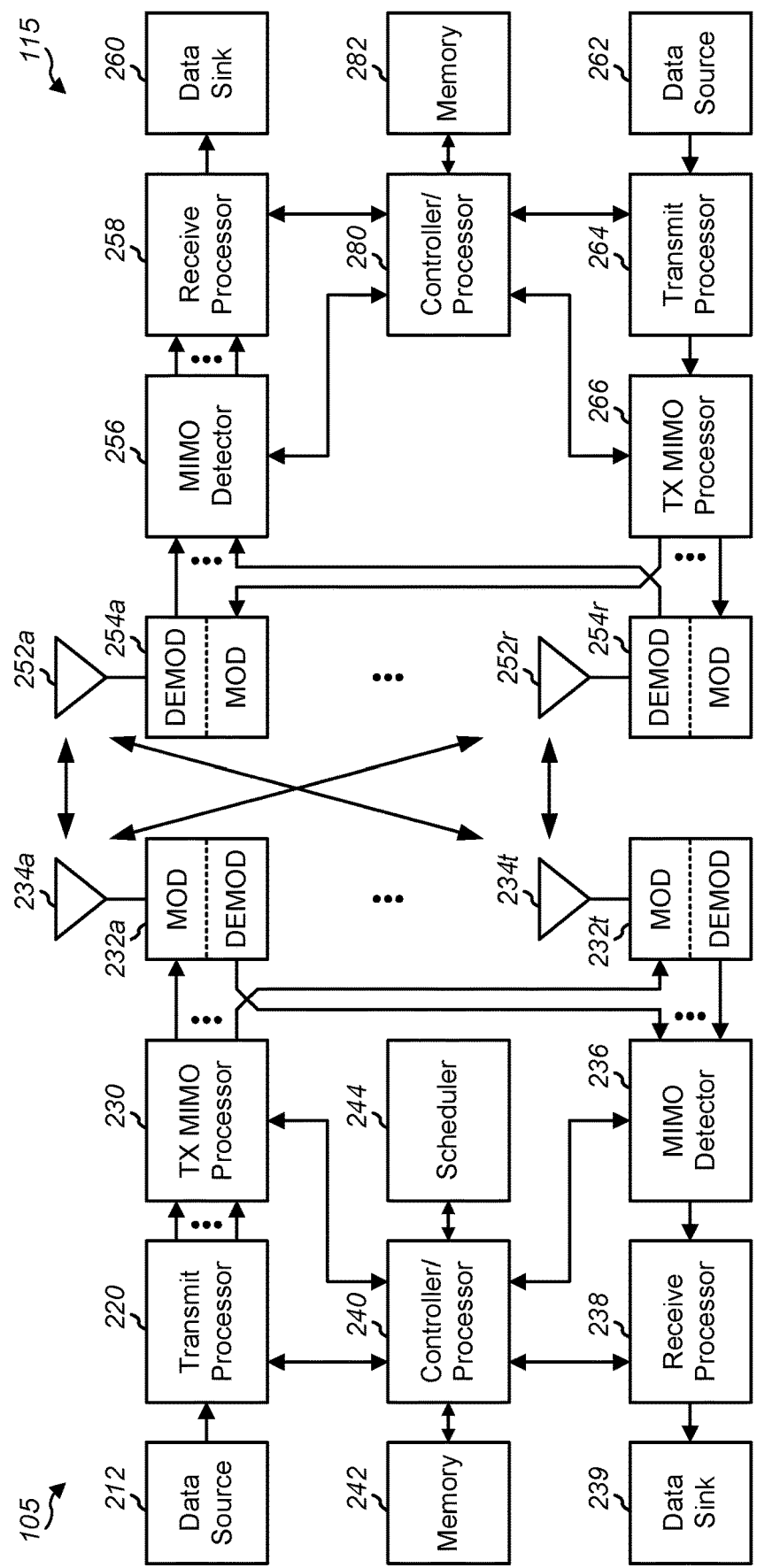
FIG. 2 is a block diagram illustrating a design of a base station and a UE configured to perform UPRG based wireless communications in accordance with some aspects of the disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., pre-coding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be pre-coded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 7-9, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
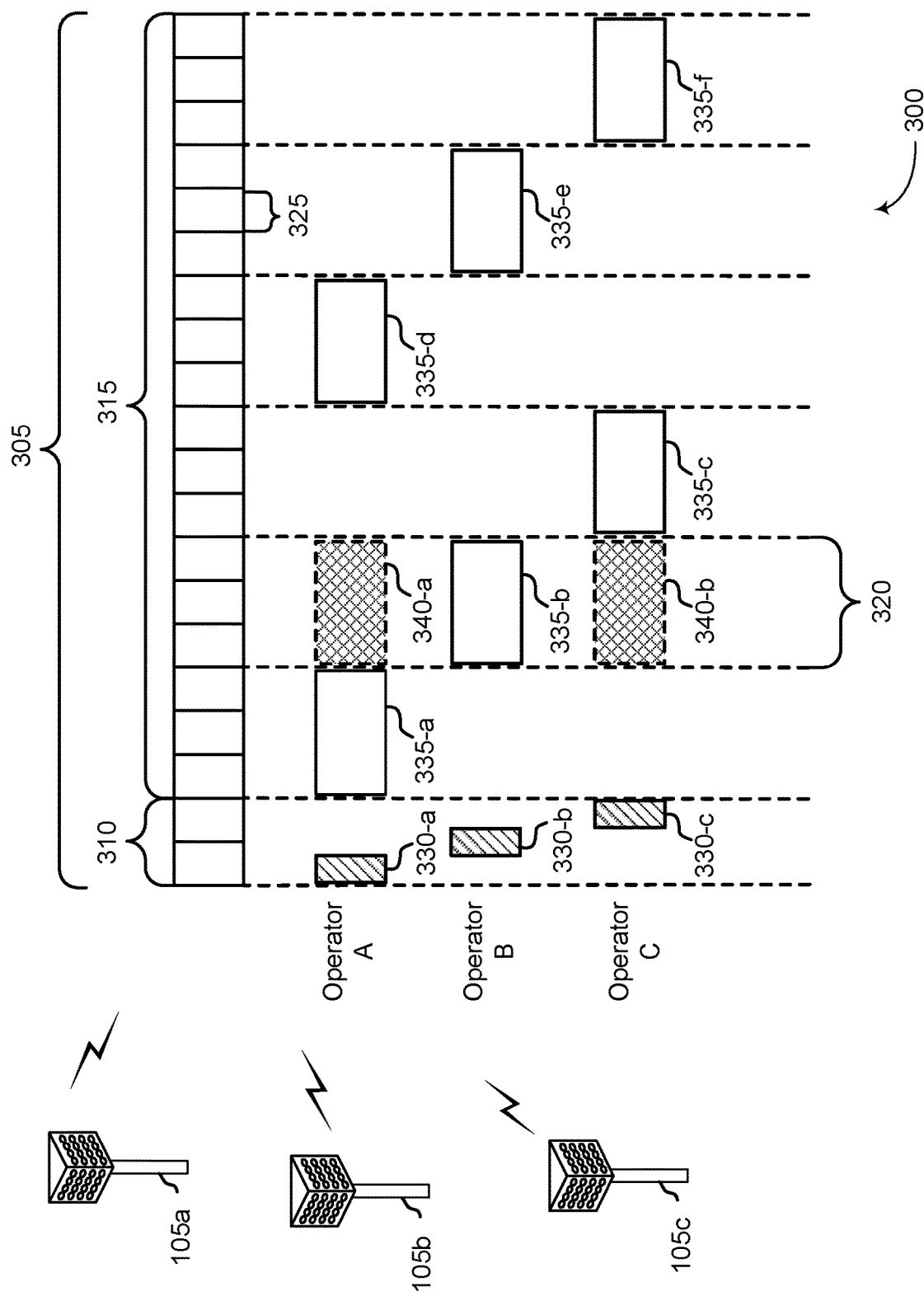
FIG. 3 is a block diagram illustrating a wireless communication system including base stations that use directional wireless beams and that perform UPRG based wireless communications in accordance with some aspects of the disclosure.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
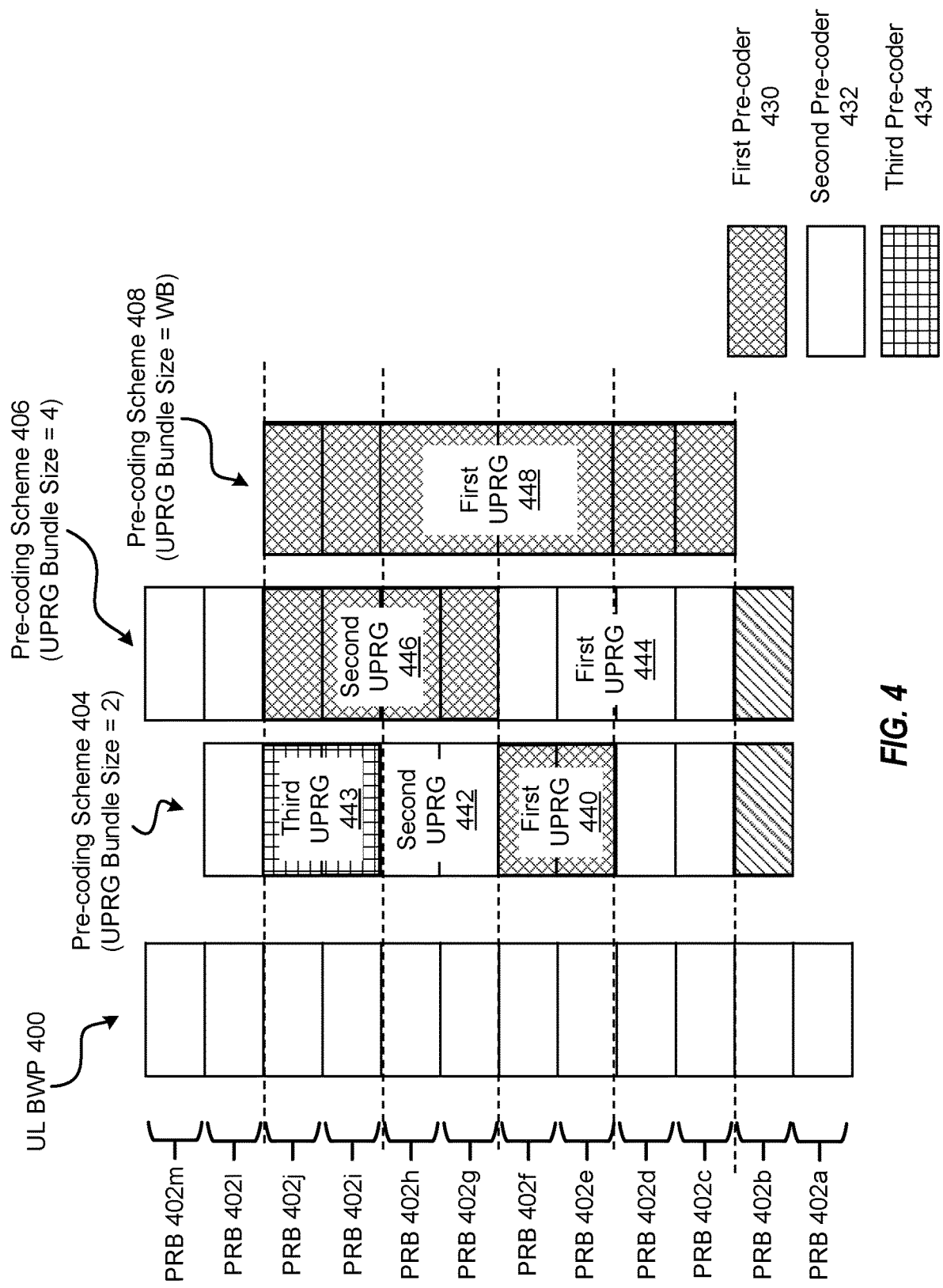
FIG. 4 is a block diagram of examples of pre-coding schemes in accordance with some aspects of the disclosure.

FIG. 4 illustrates examples of a pre-coding scheme 404, a pre-coding scheme 406, and a pre-coding scheme 408. In some examples, a UE 115 is configured to send information (e.g., data, values of a reference signal or a control signal, or other information) to a base station 105 using one or more of the pre-coding schemes 404, 406, and 408.

In FIG. 4, an uplink (UL) bandwidth part (BWP) 400 includes multiple physical resource blocks (PRBs), such as PRBs 402*a-m*. Each PRB 402*a-m* may include a set of physical resources. The UL BWP 400 may be included in a set of UL BWPs associated with a carrier or a sub-carrier of a wireless communication protocol, such as a 5G NR wireless communication protocol. Each PRB 402*a-m* may be associated with a different respective frequency or frequency range.

In the pre-coding scheme 404, information is pre-coded (e.g., by the UE 115) based on a UPRG bundle size of two. For example, the UE 115 may encode information to be transmitted via the PRBs 402*e*, 402*f* using a first pre-coder 430 to generate a first uplink pre-coding resource group (UPRG) 440. As another example, the UE 115 may encode information to be transmitted via the PRBs 402*g*, 402*h* using a second pre-coder 432 to generate a second UPRG 442. As an additional example, the UE 115 may encode information to be transmitted via the PRBs 402*i*, 402*j* using a third pre-coder 434 to generate a third UPRG 443. In some examples of the pre-coding scheme 404, the UE 115 independently determines a pre-coder for each UPRG of an uplink transmission and pre-codes each UPRG independently of other UPRGs of the uplink transmission.

In the pre-coding scheme 406, information is pre-coded (e.g., by the UE 115) based on a UPRG bundle size of four. For example, the UE 115 may encode information to be transmitted via the PRBs 402*c-f* using the second pre-coder 432 to generate a first UPRG 444. As another example, the UE 115 may encode information to be transmitted via the PRBs 402*g-j* using the first pre-coder 430 to generate a second UPRG 446. In some examples of the pre-coding scheme 406, the UE 115 independently determines a pre-coder for each UPRG of an uplink transmission and pre-codes each UPRG independently of other UPRGs of the uplink transmission. In the pre-coding scheme 408, a common pre-coder (e.g., the first pre-coder 430) is applied to each PRB of an uplink transmission.

In the pre-coding scheme 408, information is pre-coded (e.g., by the UE 115) based on a wideband (WB) bundle size. In the example of FIG. 4, the PRBs 402*c*-402*j* are pre-coded using the first pre-coder 430. For example, the UE 115 may encode information to be transmitted via the PRBs 402*c-j* using the first pre-coder 430 to generate a first UPRG 448.

Although three pre-coders 430, 432, and 434 are described for illustration, it should be appreciated that other examples are also within the scope of the disclosure. For example, a pre-coding scheme may include another number of pre-coders. Further, an uplink transmission may include a different number of PRBs or a different number of UPRGS (e.g., based on the particular UPRG bundle size and based on the particular number of PRBs). Further, it is noted that in some implementations, each UPRG of an uplink transmission is associated with a different respective pre-coder.

As used herein, a "pre-coding scheme" may refer to a UPRG bundle size used for pre-coding information. A pre-coding scheme may also involve a number of pre-coders, an ordering of pre-coders, other parameters, or a combination thereof.

Figure 5:
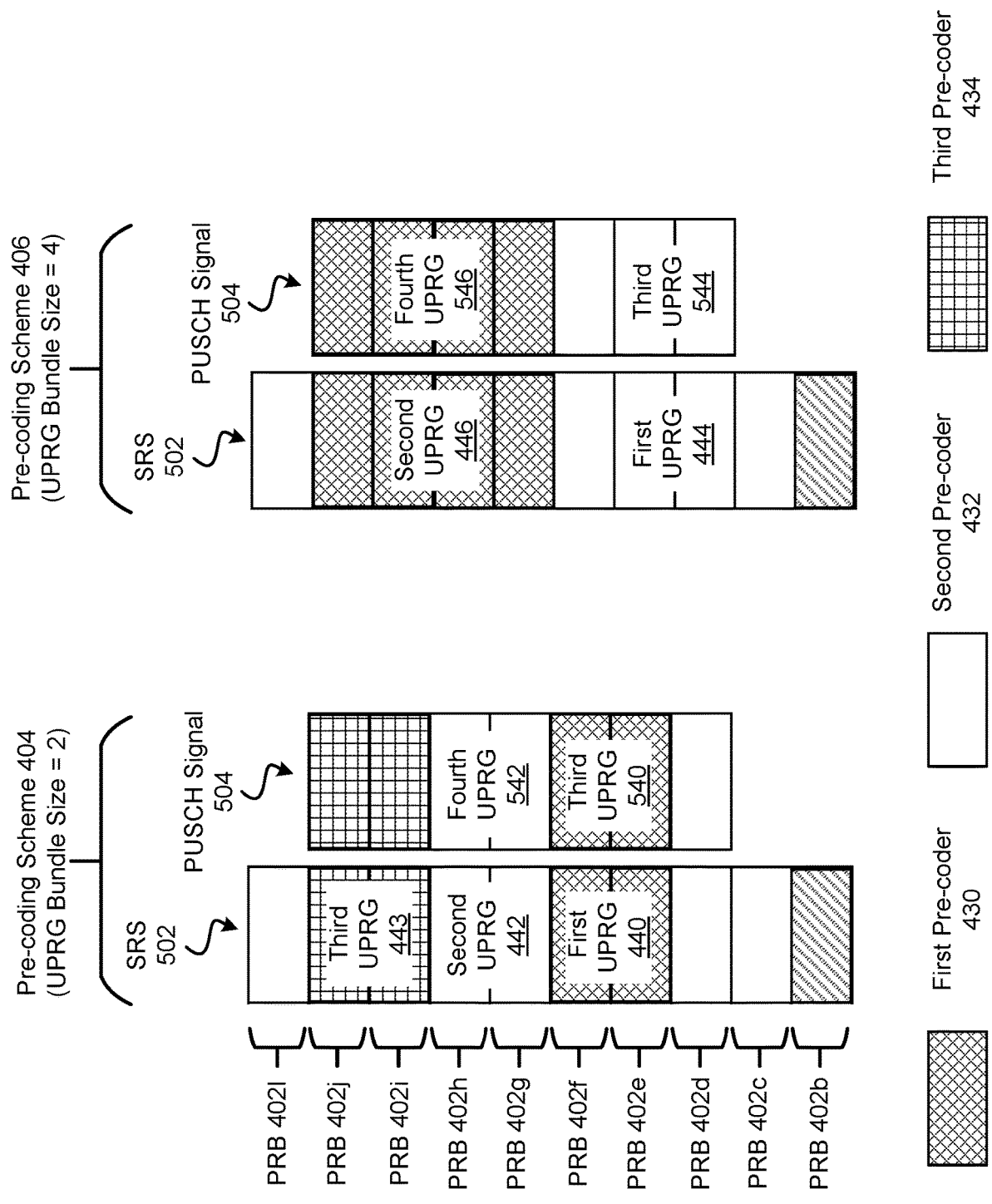
FIG. 5 is a block diagram illustrating additional aspects of pre-coding schemes in accordance with some aspects of the disclosure.

FIG. 5 illustrates additional examples of aspects associated with the pre-coding schemes 404, 406. FIG. 5 illustrates that a pre-coding scheme (e.g., the pre-coding scheme 404 or the pre-coding scheme 406) may be applied to a sounding reference signal (SRS) 502 and to a signal transmitted via a physical uplink shared channel (PUSCH), such as a PUSCH signal 504.

In the pre-coding scheme 404 of FIG. 5, information may be pre-coded (e.g., by the UE 115) based on the first pre-coder 430 to generate a third UPRG 540. Further, the UE 115 may pre-code information based on the second pre-coder 432 to generate a fourth UPRG 542.

In the pre-coding scheme 404 of FIG. 5, the SRS 502 may be pre-coded based on the pre-coding scheme 404, and the PUSCH signal 504 may be pre-coded based on the pre-coding of the SRS 502 and in alignment with pre-coding of the SRS 502. To illustrate, aligning the PUSCH signal 504 with the SRS 502 may include applying the same pre-coding to the PUSCH signal 504 as the SRS 502 based on one or more common blocks of the UL BWP 400 determined based on pre-coding of the SRS 502. For example, in both the SRS 502 and the PUSCH signal 504, pre-coding is performed using the first pre-coder 430 at the PRBs 402*e-f*. As another example, in both the SRS 502 and the PUSCH signal 504, pre-coding is performed using the second pre-coder 432 at the PRBs 402*g-h*. As an additional example, in both the SRS 502 and the PUSCH signal 504, pre-coding is performed using the third pre-coder 434 at the PRBs 402*i-j*.

In the pre-coding scheme 406 of FIG. 5, the UE 115 may pre-code information based on the second pre-coder 432 to generate a third UPRG 544. Further, the UE 115 may pre-code information based on the first pre-coder 430 to generate a fourth UPRG 546.

In the pre-coding scheme 406 of FIG. 5, the PUSCH signal 504 may be pre-coded based on the pre-coding scheme 406, and the SRS 502 may be pre-coded based on pre-coding of the PUSCH signal 504 and in alignment with pre-coding of the PUSCH signal 504. To illustrate, aligning the SRS 502 with the PUSCH signal 504 may include applying the same pre-coding to the SRS 502 as the PUSCH signal 504 based on one or more common blocks of the UL BWP 400 determined based on pre-coding of the SRS 502. For example, in both the SRS 502 and the PUSCH signal 504, pre-coding is performed using the first pre-coder 430 at the PRBs 402g-j.

In some cases, aligning the PUSCH signal 504 with the SRS 502 (or vice versa) may account for different block lengths and/or different starting blocks associated with the PUSCH signal 504 with the SRS 502. To illustrate, in the example of FIG. 5, the SRS 502 includes ten PRBs (the PRBs 402b-402l), and the PUSCH signal 504 includes seven PRBs (the PRBs 402d-402j). Further, in FIG. 5, a start of the SRS 502 corresponds to the PRB 402b, and a start of the PUSCH signal 504 corresponds to the PRB 402d. In some cases, a block length and/or a starting block can be indicated by the base station 105 to the UE 115 (e.g., in response to channel conditions or scheduling parameters). Thus, although a start block of the SRS 502 may correspond to the PRB 402b and a start block of the PUSCH signal 504 may correspond to the PRB 402d, information transmitted using the PRB 402d may be pre-coded using a same pre-coder (e.g., the second pre-coder 432) in both the SRS 502 and the PUSCH signal 504 due to alignment of both the SRS 502 and the PUSCH signal 504.

Moreover, the alignment may cause one or more of a start UPRG or an end UPRG of an uplink transmission to contain fewer PRBs than the UPRG bundle size. For example, in the example of the pre-coding scheme 404 in FIG. 5, a start UPRG of the PUSCH signal 504 includes a single PRB 402d. As another example, in the examples of the pre-coding schemes 404, 406 of FIG. 5, an end UPRG of the SRS 502 includes a single PRB 402l.

Figure 6A:
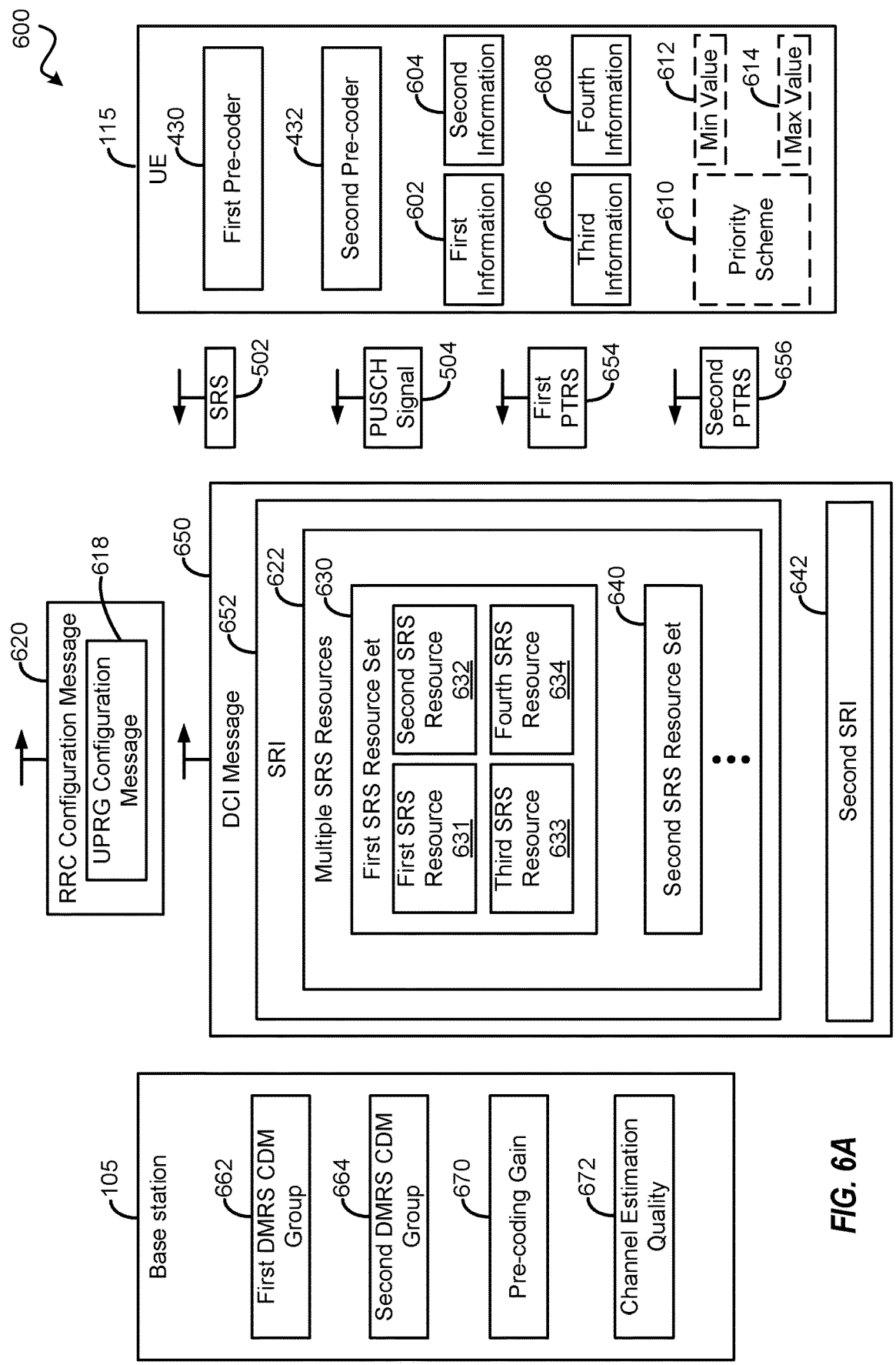
FIG. 6A is a block diagram illustrating details of a wireless communication system to perform UPRG based wireless communications in accordance with some aspects of the disclosure.

Referring to FIG. 6A, a particular illustrative example of a wireless communication system to perform uplink pre-coding resource group (UPRG) based wireless communications is depicted and generally designated 600. The wireless communication system 600 may include the base station 105 and the UE 115. Although a single base station 105 and a single UE 115 are shown in FIG. 6A for illustration, the wireless communication system 600 may include a different number of base stations 105, a different number of UEs 115, or a combination thereof.

During operation, the base station 105 and the UE 115 may exchange data, reference signals, and other information. In FIG. 6A, the UE 115 stores first information 602, second information 604, third information 606, and fourth information 608. The information 602, 604, 606, and 608 may correspond to data, values of a reference signal or control signal, or other information that is to be transmitted to the base station 105. In one example, the first information 602 and the second information 604 are included in the SRS 502, and the third information 606 and the fourth information 608 are included in the PUSCH signal 504. In another example, the first information 602 and the second information 604 are included in the PUSCH signal 504, and the third information 606 and the fourth information 608 are included in the SRS 502.

To further illustrate, in some implementations, the base station 105 may provide a non-zero power channel state information reference signal (NZP CSI-RS) to the UE 115. The UE 115 may measure the NZP CSI-RS and perform operations based on the measurements. In some examples, the UE 115 selects "candidate" pre-coders (e.g., the pre-coders 430, 432) based on the measurements and pre-codes values of the SRS 502 based on the candidate pre-coders. The UE 115 may send the SRS 502 to the base station 105 to indicate the candidate pre-coders. The base station 105 may select a pre-coder (e.g., the first pre-coder 430 or the second pre-coder 432) from among the candidate pre-coders (e.g., based on measurements of the SRS 502) and may provide an indication of the selected pre-coder to the UE 115. In some examples, the UE 115 uses the selected pre-coder to pre-code a signal transmitted via a PUSCH, such as the PUSCH signal 504.

In some implementations, the base station 105 is configured to select a UPRG bundle size and to indicate, to the UE 115, a UPRG bundle size. For example, the base station 105 may be configured to provide a radio resource control (RRC) configuration message 620 to the UE 115. The RRC configuration message 620 may include a UPRG configuration message 618 indicating a UPRG bundle size of the SRS 502, indicating a UPRG bundle size of the PUSCH signal 504, or indicating UPRG bundle sizes of both the SRS 502 and the PUSCH signal 504. Further, the base station 105 may change bundle sizes associated with the SRS 502, the PUSCH signal 504, or both the SRS 502 and the PUSCH signal 504, such as by resending the RRC configuration message 620 including one or more different UPRG bundle sizes.

In one example, a pre-coding scheme (e.g., the pre-coding scheme 404, the pre-coding scheme 406, or another pre-coding scheme) is selected for pre-coding of the SRS 502, and the PUSCH signal 504 is pre-coded based on the pre-coding scheme (e.g., where pre-coding of the PUSCH signal 504 "follows" or "mirrors" pre-coding of the SRS 502). In this example, pre-coding of the PUSCH signal 504 may be performed in alignment with pre-coding of the SRS 502 (e.g., where common PRBs of the SRS 502 and the PUSCH signal 504 are associated with a common pre-coder, such as either the first pre-coder 430 or the second pre-coder 432).

In another example, a pre-coding scheme (e.g., the pre-coding scheme 404, the pre-coding scheme 406, or another pre-coding scheme) is selected for pre-coding of the PUSCH signal 504, and the SRS 502 is pre-coded based on the pre-coding scheme (e.g., where pre-coding of the SRS 502 "follows" or "mirrors" pre-coding of the PUSCH signal 504). In this example, re-coding of the SRS 502 may be performed in alignment with pre-coding of the PUSCH signal 504 (e.g., where common PRBs of the SRS 502 and the PUSCH signal 504 are associated with a common pre-coder, such as either the first pre-coder 430 or the second pre-coder 432).

In an additional example, a first pre-coding scheme is selected for the SRS 502, and another pre-coding scheme is selected for the PUSCH signal 504. A common pre-coding scheme for the SRS 502 and the PUSCH signal 504 may be selected from among the first pre-coding scheme and the second pre-coding scheme based on one or more selection criteria. In some implementations, the one or more selection criteria are selected by the base station 105 and are communicated by the base station 105 to the UE 115.

To illustrate, in one example of the one or more selection criteria, the one of more selection criteria include a priority scheme 610. The priority scheme 610 may indicate that one UPRG bundle size is associated with a different priority as compared to another UPRG bundle size. To illustrate, the priority scheme 610 may specify that pre-coding associated with the SRS 502 is "preferred" and that the PUSCH signal 504 is to be pre-coded based on and in alignment with pre-coding of the SRS 502 (e.g., where a UPRG bundle size of the PUSCH signal 504 is selected based on a UPRG bundle size of the SRS 502). Alternatively, in other examples, the priority scheme 610 may specify that pre-coding associated with the PUSCH signal 504 is "preferred" and that the SRS 502 is to be pre-coded based on and in alignment with pre-coding of the PUSCH signal 504 (e.g., where a UPRG bundle size of the SRS 502 is selected based on a UPRG bundle size of the PUSCH signal 504).

In another example of the one or more selection criteria, a pre-coding scheme is selected from among multiple pre-coding schemes based on a "minimum" (min) value 612. The min value 612 may correspond to the lesser of a first UPRG bundle size associated with the SRS 502 and a second UPRG bundle size associated with the PUSCH signal 504. As an illustrative example, if the SRS 502 is associated with a UPRG bundle size of two, and the PUSCH signal 504 is associated with a UPRG bundle size of four, then the min value 612 may correspond to two. In this example, a UPRG bundle size of two may be applied to pre-coding of both the SRS 502 and the PUSCH signal 504 (e.g., by pre-coding both the SRS 502 and the PUSCH signal 504 according to the pre-coding scheme 404).

In an additional example of the one or more selection criteria, a pre-coding scheme is selected from among multiple pre-coding schemes based on a "maximum" (max) value 614. The max value 614 may correspond to the greater of a first UPRG bundle size associated with the SRS 502 and a second UPRG bundle size associated with the PUSCH signal 504. As an illustrative example, if the SRS 502 is associated with a UPRG bundle size of two, and the PUSCH signal 504 is associated with a UPRG bundle size of four, then the max value 614 may correspond to four. In this example, a UPRG bundle size of four may be applied to pre-coding of both the SRS 502 and the PUSCH signal 504 (e.g., by pre-coding both the SRS 502 and the PUSCH signal 504 according to the pre-coding scheme 406).

In accordance with aspects of the disclosure, the UE 115 may be configured to transmit the SRS 502 using one or more SRS resources indicated by the base station 105. To illustrate, the base station 105 may be configured to send, to the UE 115, In one example, the base station 105 is configured to send a downlink control information (DCI) message 650 including an SRS resource indicator (SRI) 652. The SRI 652 may indicate multiple SRS resources 622. The multiple SRS resources 622 may be associated with one or more SRS resource sets, such as a first SRS resource set 630 and a second SRS resource set 640. For example, the multiple SRS resources 622 may include a first SRS resource 631, a second SRS resource 632, a third SRS resource 633, and a fourth SRS resource 634 that are included in a first SRS resource set 630.

In accordance with some aspects of the disclosure, the UE 115 may be configured to perform pre-coding on a per-SRS resource basis. Alternatively, in another example, the UE 115 may be configured to perform pre-coding on a per-SRS resource set basis to each SRS resource set with a common UPRG bundle size applied to each code division multiplexing (CDM) group of multiple CDM groups. Alternatively, in another example, the UE 115 may be configured to perform pre-coding on a per-SRS resource set basis to multiple SRS resource sets with a different UPRG bundle size applied to each CDM group of multiple CDM groups.

To illustrate, in one example of performing pre-coding on a per-SRS resource basis, a pre-coding scheme may be applied on a per-SRS resource basis to each SRS resource of the first SRS resource set 630. For example, the UE 115 may pre-code first values of the SRS 502 via a first pre-coding scheme and may transmit the pre-coded first values using the first SRS resource 631, and the UE 115 may pre-code second values of the SRS 502 via a second pre-coding scheme and may transmit the pre-coded second values using the second SRS resource 632. As additional examples, the UE 115 may pre-code third values of the SRS 502 via a third pre-coding scheme and may transmit the pre-coded third values using the third SRS resource 633, and the UE 115 may pre-code fourth values of the SRS 502 via a fourth pre-coding scheme and may transmit the pre-coded fourth values using the fourth SRS resource 634. Thus, each SRS resource of an SRS resource set may be pre-coded separately on a per-SRS resource basis.

In some examples of pre-coding on a per-SRS resource basis, different DMRS CDM groups may be associated with different UPRG bundle sizes. For example, the first SRS resource 631 and the second SRS resource 632 may be associated with a first demodulation reference signal (DMRS) code division multiplexing (CDM) group 662 that is associated with a first UPRG bundle size, and the third SRS resource 633 and the fourth SRS resource 634 may be associated with a second DMRS CDM group 664 that is associated with a second UPRG bundle size different then the first UPRG bundle size. Thus, different DMRS CDM groups may be associated with different UPRG bundle sizes.

In some examples of pre-coding on a per-SRS resource basis, SRS resources associated with a common UPRG bundle size are associated with a common phase tracking reference signal (PTRS). To illustrate, the first SRS resource 631 and the second SRS resource 632 may be associated with a first PTRS 654 and a first UPRG bundle size, and the third SRS resource 633 and the fourth SRS resource 634 may be associated with a second PTRS 656 and a second UPRG bundle size that is different than the first UPRG bundle size. In some examples, the first PTRS 654 is pre-coded using a same pre-coding scheme that is used to pre-code information transmitted using the first SRS resource 631 or the second SRS resource 632. The second PTRS 656 may be pre-coded using the same pre-coding scheme that is used to pre-code information transmitted using the third SRS resource 633 or the fourth SRS resource 634.

In an example of performing pre-coding on a per-SRS resource set basis with a different UPRG bundle size applied to each CDM group of multiple CDM groups, each SRS resource of an SRS resource set may be associated with a common pre-coding scheme. For example, values of the SRS 502 transmitted using the SRS resources 631, 632, 633, and 634 may be pre-coded using a common pre-coding scheme (e.g., using a common UPRG bundle size). Thus, each SRS resource of an SRS resource set may be associated with a common pre-coding scheme.

In some examples of performing pre-coding on a per-SRS resource set basis with a different UPRG bundle size applied to each CDM group of multiple CDM groups, multiple DMRS CDM groups may be associated with a common pre-coding scheme (e.g., a common UPRG bundle size). For example, the first SRS resource 631 and the second SRS resource 632 may be associated with the first DMRS CDM group 662, which may be associated with a particular UPRG bundle size. The third SRS resource 633 and the fourth SRS resource 634 may be associated with the second DMRS CDM group 664, which may be associated with the particular UPRG bundle size.

In an example of performing pre-coding on a per-SRS resource set basis with a different UPRG bundle size applied to each CDM group of multiple CDM groups, the multiple SRS resources 622 include multiple SRS resource sets, such as the first SRS resource set 630 and the second SRS resource set 640. The SRI 652 may be associated with the first SRS resource set 630 and further associated with the second SRS resource set 640.

The first SRS resource set 630 may be associated with the first DMRS CDM group 662, and the first DMRS CDM group 662 may be associated with a first UPRG bundle size. The second SRS resource set 640 may be associated with the second DMRS CDM group 664, which may be associated with a second UPRG bundle size that is different than the first UPRG bundle size. The first DMRS CDM group 662 may be associated with the SRI 652, and the second DMRS CDM group 664 may be associated with a second SRI 642 indicated by the DCI message 650.

In some examples, the base station 105 is configured to indicate a type of SRS resource allocation using the UPRG configuration message 618. For example, the UPRG configuration message 618 may indicate pre-coding on a per-SRS resource basis, such as where the SRS resources 631, 632 are to be associated with a first UPRG bundle size, and where the SRS resources 633, 634 are to be associated with a second UPRG bundle size different than the first UPRG bundle size. In another example, the UPRG configuration message 618 may indicate pre-coding on a per-SRS resource set basis with a common UPRG bundle size applied to each CDM group of multiple CDM groups, such as where SRS resources of the first SRS resource set 630 and the DMRS CDM groups 662, 664 are to be associated with a common UPRG bundle size. In an additional example, the UPRG configuration message 618 may indicate pre-coding on a per-SRS resource set basis with different UPRG bundle sizes applied to different CDM groups of multiple CDM groups, such as where the first SRS resource set 630, the first DMRS CDM group 662, and the SRI 652 are associated with a first UPRG bundle size, and where the second SRS resource set 640, the second DMRS CDM group 664, and the second SRI 642 are associated with a second UPRG bundle size different than the first UPRG bundle size.

In some implementations, UPRG signaling may be performed according to a "PUSCH only" technique. For example, a UPRG bundle size associated with the SRS 502 may remain static, and a UPRG bundle size of the PUSCH signal 504 may be set using the UPRG configuration message 618.

In some examples, the base station 105 is configured to dynamically select (or change) a pre-coding scheme (e.g., a UPRG bundle size) based on one or more criteria. In some examples, the one or more criteria include a pre-coding gain 670 and a channel estimation quality 672. To illustrate, as a UPRG bundle size of the SRS is reduced, quality of channel estimation performed by the base station 105 based on the SRS 502 may be reduced (e.g., due to fewer PRBs being allocated to each channel estimation operation). In some cases, a poor channel estimation quality 672 may reduce quality of communications between the base station 105 and the UE 115, such as if the base station 105 is unable to decode or demodulate signals received from the UE 115 due to the reduced channel estimation quality 672. Thus, in one example, to increase the channel estimation quality 672, the base station 105 may increase a UPRG bundle size (e.g., via the UPRG configuration message 618).

In some cases, increasing the UPRG bundle size may reduce the pre-coding gain 670 (e.g., due to reduced gain associated with fewer PRBs in each UPRG). As a result, the base station 105 may be configured to dynamically adjust a UPRG bundle size, such as by increasing the UPRG bundle size in response to detecting that the channel estimation quality 672 fails to satisfy (e.g., is less than) a first threshold, or by decreasing the UPRG bundle size in response to detecting that the pre-coding gain 670 (or an estimate of the pre-coding gain 670) fails to satisfy a second threshold.

In one more operations described herein may be performed in connection with a particular communication mode of operation. A particular communication mode of operation may be specified by a wireless communication protocol used by the base station 105 and the UE 115. In some examples, the particular communication mode corresponds to a non-codebook based (NCB) multiple-input, multiple-output (MIMO) mode specified by a 5G NR protocol. In other examples, one or more other communication modes may be used.

A wireless communication system in accordance with one or more aspects of FIGS. 4-6 may increase reliability of uplink communications in a wireless communication system 600. In one example, the UPRG bundle size can be increased to improve the channel estimation quality 672. For example, by increasing the UPRG bundle size, a number of PRBs used for each channel estimation operation may be increased, thus increasing a "sample size" for a channel estimate. As a result, the channel estimation quality 672 may be increased due to the greater UPRG bundle size. In one example, a wideband (WB) UPRG bundle size is selected to achieve a "maximum" channel estimation quality 672 of a range of channel estimate qualities.

In another example, the UPRG bundle size can be decreased to improve pre-coding gain 670 associated with one or more communications in the wireless communication system 600. For example, as the UPRG bundle size is decreased, a number of transitions is increased between pre-coders (e.g., from pre-coding using the first pre-coder 430 to pre-coding using the second pre-coder 432). As a result, frequency selectivity of an uplink transmission can be increased, improving pre-coding gain 670 associated with the uplink transmission. In some cases, increased pre-coding gain 670 can improve reliability of an uplink transmission.

Thus, in accordance with some aspects of the disclosure, UPRG based communications increase reliability of uplink communications in a wireless communication system 600. For example, based on the particular channel conditions, particular device characteristics, or other parameters, a UPRG bundle size can be selected. The UPRG bundle size can be selected to achieve a "trade-off" between channel estimation quality 672 and pre-coding gain 670. As a result, characteristics of uplink signals transmitted within the wireless communication system 600 can be determined more accurately as compared to certain conventional techniques that avoid pre-coding of uplink signals or that pre-code uplink signals each using a common pre-coding technique.

Alternatively or in addition, in some aspects of the disclosure, the UE 115 may pre-code an uplink signal based on a particular pre-coder (e.g., the first pre-coder 430 or the second pre-coder 432) to generate a pre-coded uplink signal (e.g., the SRS 502 or the PUSCH signal 504) and may transmit the pre-coded uplink signal to the base station 105. The pre-coded uplink signal may have one or more characteristics that implicitly indicate the particular pre-coder to the base station 105 without use of an explicit indication of the particular pre-coder, which may reduce a number or size of messages communicated within the wireless communication system 600 (and which may increase a number of resources available for other communications).

Figure 6B:
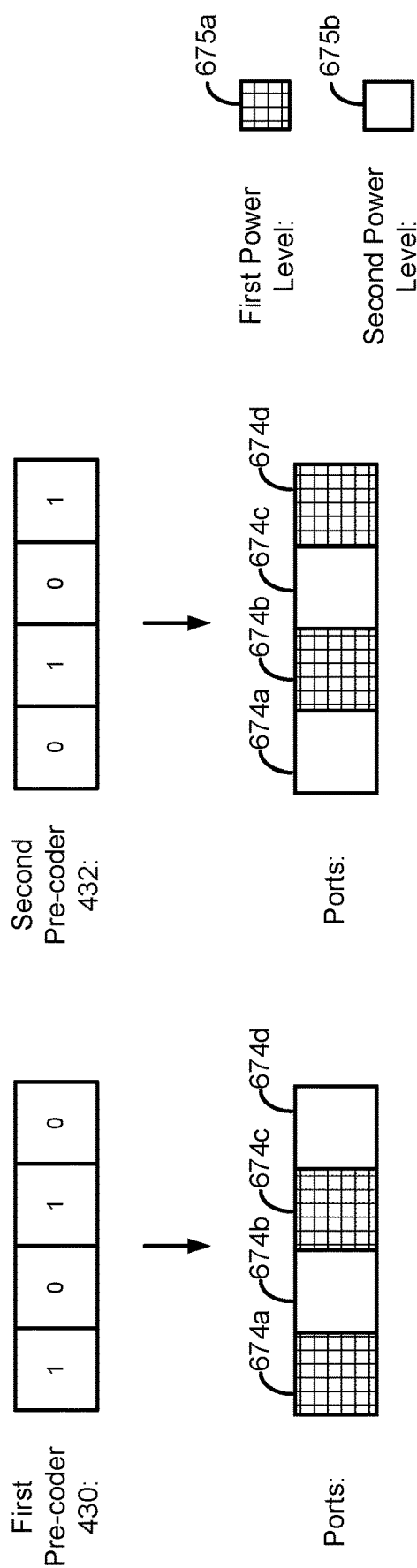
FIG. 6B illustrates an example of a mapping of power levels to ports of a UE that may enable a base station to identify a particular pre-coder.

For example, FIG. 6B illustrates an example of a mapping of power levels to ports of the UE 115 that may enable the base station 105 to identify a particular pre-coder. The ports may include ports 674a, 674b, 674c, and 674d, and the power levels may include a first power level 675a and a second power level 675*b* that is different than the first power level 675*a*. FIG. 6B illustrates that pre-coding of an uplink signal based on the first pre-coder 430 may result in a first mapping of power levels to the ports 674*a-d* and that pre-coding of the uplink signal based on the second pre-coder 432 may result in a second mapping of power levels to the ports 674*a-d* different than the first mapping.

In some examples, the UE 115 includes transmit circuitry that applies the first power level 675*a* to a first port (such as the port 674*a* or the port 674*c*) based on a first bit value of the particular pre-coder (e.g., "1") and to apply the second power level 675*b* to a second port (such as the port 674*b* or the port 674*d*) based on a second bit value (e.g., "0") of the particular pre-coder. As a result, values of an uplink signal that are pre-coded based on the first bit value may be transmitted based on the first power level 675*a*, and values of the uplink signal that are pre-coded based on the second bit value may be transmitted based on the second power level 675*b*. In some examples, the transmit circuitry includes or corresponds to one or more components described with reference to FIG. 2, such as the modulators 254*a-r*, the transmit processor 264, or the TX MIMO processor 266. The UE 115 may transmit the pre-coded uplink signal using the transmit circuitry and one or more antennas, such as the antennas 252*a-r* of FIG. 2.

In some examples, the UE 115 applies the power levels 675*a*, 675*b* to different UPRGs. To illustrate, the transmit circuitry of the UE 115 may apply the first power level 675*a* to one of the UPRGs 440, 442, 443, 444, 446, and 448 and may apply the second power level 675*b* to another of the UPRGs 440, 442, 443, 444, 446, and 448. Accordingly, in some implementations, a particular UPRG may be associated with a particular bit value (e.g., "0" or "1") of a pre-coder and with a particular power level, and another UPRG may be associated with another bit value (e.g., "1" or "0") of the pre-coder and with another particular power level.

The base station 105 may receive the pre-coded uplink signal and may identify, based on one or more characteristics of pre-coded uplink signal, the particular pre-coder used by the UE 115 to pre-code the uplink signal. To illustrate, the base station 105 may determine a respective power level associated with each port of the ports 674*a*, 674*c* used to transmit the pre-coded uplink signal. As an example, if the base station 105 determines that the ports 674*a*, 674*c* are associated with the first power level 675*a* and that the ports 674*a*, 674*c* are associated with the second power level 675*b*, then the base station 105 may identify the first pre-coder 430. As another example, if the base station 105 determines that the ports 674*a*, 674*c* are associated with the second power level 675*b* and that the ports 674*a*, 674*c* are associated with the first power level 675*a*, then the base station 105 may identify the second pre-coder 432. In some examples, the base station 105 compares power levels of the pre-coded uplink transmission to a reference power level value to identify the first power level 675*a* and the second power level 675*b*. The base station 105 may decode the pre-coded uplink signal using the identified pre-coder.

In some examples, the UE 115 determines a plurality of pre-coders and selects the particular pre-coder from among the plurality of pre-coders. For example, the plurality of pre-coders may include or correspond to the pre-coders 430, 432, 434, one or more other pre-coders, or a combination thereof.

In some examples, the UE 115 determine a plurality of pre-coders based on a message received from the base station 105 and indicating the plurality of pre-coders. The UE 115 may select the particular pre-coder from among the plurality of pre-coders. For example, the message may correspond to an RRC configuration message, such as the RRC configuration message 620. In another example, the message corresponds to a medium access control (MAC) control element (MAC-CE) activation message. In such examples, the base station 105 may directly indicate the plurality of pre-coders to the UE 115. In some implementations, the base station 105 selects the plurality of pre-coders based on one or more parameters, such as to achieve a particular pre-coding gain (e.g., the pre-coding gain 670) or a particular channel estimation quality (e.g., the channel estimation quality 672). The base station 105 may include a transmitter configured to transmit the message, and the transmitter may include one or more components illustrated in FIG. 2.

In some other examples, the UE 115 may determine the plurality of pre-coders without an explicit indication from the base station 105. In some implementations, the UE 115 selects the plurality of pre-coders based on one or more parameters, such as to achieve a particular pre-coding gain (e.g., the pre-coding gain 670) or a particular channel estimation quality (e.g., the channel estimation quality 672). In another example, the plurality of pre-coders may be specified by a wireless communication protocol used by the UE 115 to communicate with the base station 105. In some examples, the UE 115 may transmit an indication of the plurality of pre-coders to the base station 105. The indication may be included in a MAC-CE report message, as an illustrative example. The base station 105 may include a receiver configured to receive the indication, and the receiver may include one or more components illustrated in FIG. 2.

Figure 6C:
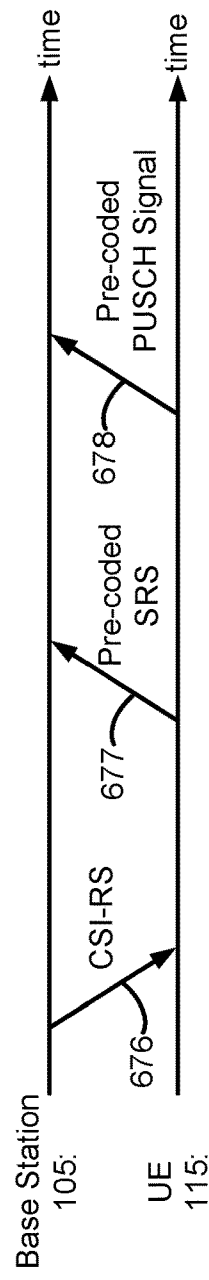
FIG. 6C illustrates examples of operations that may be performed by a UE and a base station.

In some examples, the UE 115 selects the particular pre-coder from among the plurality of pre-coders based on a channel state information (CSI) reference signal (CSI-RS) (e.g., the NZP CSI-RS described above) received from the base station 105. To illustrate, FIG. 6C illustrates examples of operations that may be performed by the UE 115 and the base station 105. In FIG. 6C, the UE 115 may receive a CSI-RS from the base station 105, at 676. In some examples, the UE 115 includes a receiver to receive the CSI-RS from the base station 105. The receiver may include the demodulators 254*a-r*, the MIMO detector 256, or the receive processor 258, one or more other components, or a combination thereof.

Based on the CSI-RS, the UE 115 may select the particular pre-coder from among the plurality of pre-coders. The UE 115 may pre-code an SRS based on the particular pre-coder and may transmit the pre-coded SRS to the base station 105, at 677. The base station 105 may determine the particular pre-coder based on one or more characteristics of the pre-coded SRS. The UE 115 may pre-code a PUSCH signal based on the particular pre-coder and may transmit the pre-coded PUSCH signal to the base station 105, at 678. The base station 105 may receive the pre-coded PUSCH signal and may decode the pre-coded PUSCH signal based on the particular pre-coder previously identified using the pre-coded SRS.

In some examples, the UE 115 includes a plurality of antennas and a transmitter coupled to the plurality of antennas. For example, the plurality of antennas may include one or more of the antennas 252*a-r*, and the transmitter may include the transmit processor 264, the TX MIMO processor 266, the modulators 254*a-r*, one or more other devices, or a combination thereof. The transmitter may transmit the pre-coded uplink signal using a subset (which may also be referred to herein as a proper subset, or fewer than all) of the plurality of antennas. The one or more characteristics of the pre-coded uplink signal may enable the base station 105 to identify the particular pre-coder in connection with transmission of the pre-coded uplink signal using the subset of the plurality of antennas. For example, the UE 115 may a first number of antennas to transmit the SRS 502 and may use a second number of antennas different than the first number to transmit the PUSCH signal 504. If both of the SRS 502 and the PUSCH signal 504 have the one or more characteristics, the one or more characteristics may enable the base station 105 to receive (and decode) the SRS 502 and the PUSCH signal 504 irrespective of a change in the number of antennas used to transmit the PUSCH signal 504 relative to the SRS 502.

It is noted that the examples herein are illustrative and that other examples are also within the scope of the disclosure. To illustrate, although the example of FIG. 6B illustrates that the pre-coders 430, 432 may each include a four-bit pattern, in other implementations, the pre-coders 430, 432 may include a different pattern of bits. As another example, although the FIG. 6B illustrates that each bit of the pre-coders 430, 432 each associated with a respective power level, in some other examples, another mapping may be used, such as if each set of multiple bits (e.g., "10" or "01") is mapped to a respective power level. As an additional example, although FIG. 6B illustrates that the pre-coders 430, 432 are associated with the same power levels 675a, 675b, in some other implementations, the second pre-coder 432 may be associated with different power levels than the first pre-coder 430, such as if the second pre-coder 432 is associated with a third power level and a fourth power level that are different than the power levels 675a, 675b.

One or more aspects herein may improve performance of a wireless communication system. For example, by implicitly indicating a particular pre-coder to the base station 105, the UE 115 and the base station 105 may reduce or avoid transmission of messages that explicitly indicate the particular pre-coder. As a result, a number of transmitted messages may be reduced in the wireless communication system 600, which may increase resources available for other transmissions (such as data transmissions), reduce latency or interference, or a combination thereof.

Figure 6D:
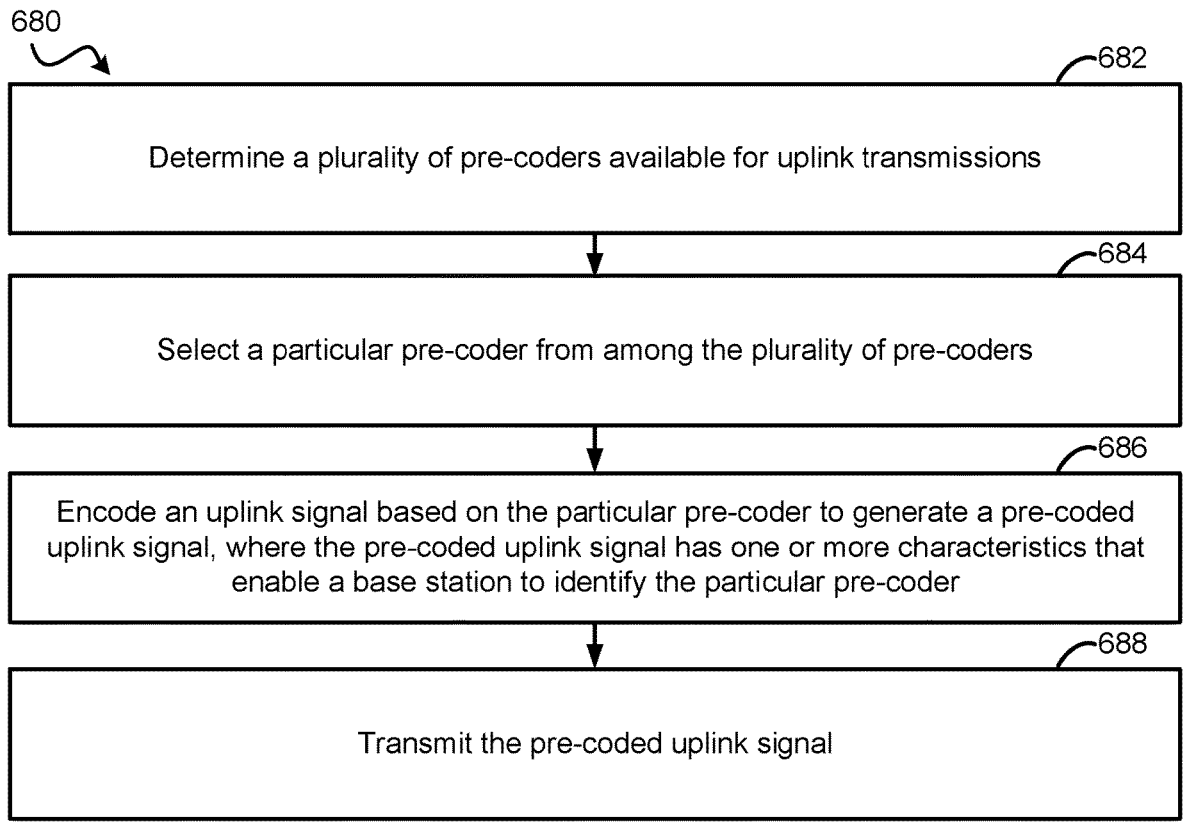
FIG. 6D is a flow chart of a method of wireless communication that may be performed by a UE according to some aspects of the disclosure.

FIG. 6D illustrates an example of a method 680 of wireless communication according to some aspects of the disclosure. In some examples, the method 680 is performed by a UE, such as the UE 115. For example, the UE 115 may include one or more processors (such as the controller/processor 280) configured to initiate, perform, or control operations of the method 680.

The method 680 includes determining a plurality of pre-coders available for uplink transmissions, at 682. For example, the plurality of pre-coders may include or correspond to the pre-coders 430, 432.

The method 680 further includes selecting a particular pre-coder from among the plurality of pre-coders, at 684. For example, the particular pre-coder may correspond to the first pre-coder 430 or the second pre-coder 432.

The method 680 further includes encoding an uplink signal based on the particular pre-coder to generate a pre-coded uplink signal, at 686. The pre-coded uplink signal has one or more characteristics that enable a base station to identify the particular pre-coder. For example, the pre-coded uplink signal may correspond to the SRS 502 or the PUSCH signal 504. The one or more characteristics may correspond to a mapping of the power levels 675a, 675b to bits of the uplink signal based on bit values of the particular pre-coder.

For example, if the particular pre-coder corresponds to the first pre-coder 430, then first values of the uplink signal may be transmitted based on the first power level 675a, and second values of the uplink signal may be transmitted based on the second power level 675b. In some other examples, if the particular pre-coder corresponds to the second pre-coder 432, then the first values of the uplink signal may be transmitted based on the second power level 675b, and the second values of the uplink signal may be transmitted based on the first power level 675a.

The method 680 further includes transmitting the pre-coded uplink signal, at 688. For example, the UE 115 may transmit the SRS 502 or the PUSCH signal 504 to the base station 105.

Figure 6E:
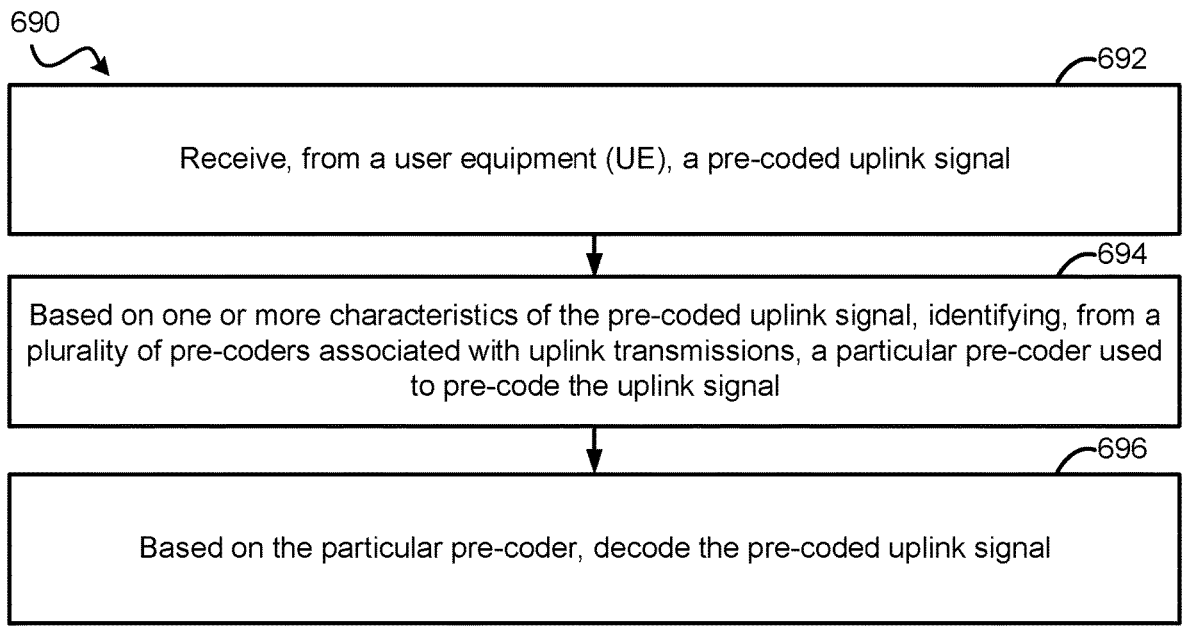
FIG. 6E is a flow chart of a method of wireless communication that may be performed by a base station according to some aspects of the disclosure.

FIG. 6E illustrates an example of a method 690 of wireless communication according to some aspects of the disclosure. In some examples, the method 680 is performed by a base station, such as the base station 105. For example, the base station 105 may include one or more processors (such as the controller/processor 240) configured to initiate, perform, or control operations of the method 690.

The method 690 includes receiving, from a UE, a pre-coded uplink signal, at 692. For example, the base station 105 may receive the SRS 502 or the PUSCH signal 504 from the UE 115.

The method 690 further includes, based on one or more characteristics of the pre-coded uplink signal, identifying, from a plurality of pre-coders associated with uplink transmissions, a particular pre-coder used to pre-code the uplink signal, at 694. For example, the base station 105 may identify, based on a mapping of the power levels 675a, 675b to values of the pre-coded uplink signal, whether the uplink signal was pre-coded using the first pre-coder 430 or the second pre-coder 432.

The method 690 further includes, based on the particular pre-coder, decoding the pre-coded uplink signal, at 696. For example, the base station 105 may use the particular pre-coder to decode the SRS 502 or the PUSCH signal 504.

Figure 7:
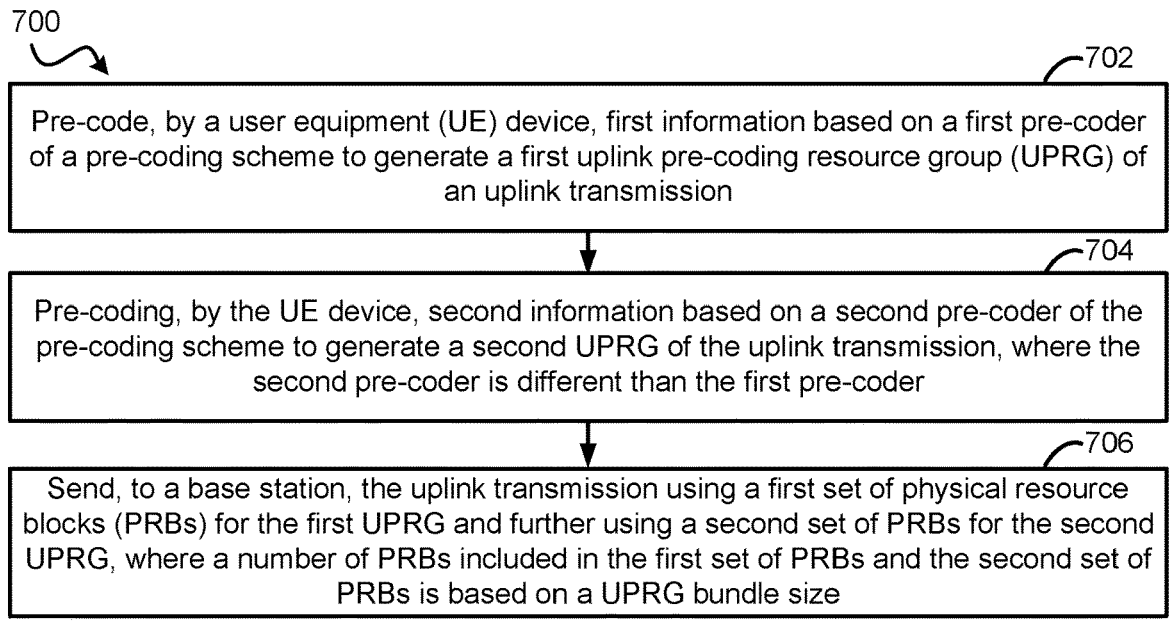
FIG. 7 is a flow chart of a method of wireless communication by a UE to perform UPRG based wireless communications in accordance with some aspects of the disclosure.

Referring to FIG. 7, an example of a method of wireless communication is depicted and generally designated 700. In some examples, operations of the method 700 are performed by the UE 115.

The method 700 includes pre-coding, by a UE device, first information based on a first pre-coder of a pre-coding scheme to generate a first UPRG of an uplink transmission, at 702. For example, the UE 115 may pre-code the first information 602 using the first pre-coder 430 to generate the first UPRG 440 or the first UPRG 444. The pre-coding scheme may correspond to the pre-coding scheme 404, the pre-coding scheme 406, or another pre-coding scheme. The uplink transmission may be a MIMO uplink transmission.

The method 700 further includes pre-coding, by the UE device, second information based on a second pre-coder of the pre-coding scheme to generate a second UPRG of the uplink transmission, at 704. The second pre-coder is different than the first pre-coder. For example, the UE 115 may pre-code the second information 604 using the second pre-coder 432 to generate the second UPRG 442 or the second UPRG 446.

The method 700 further includes sending, to a base station, the uplink transmission using a first set of PRBs for the first UPRG and further using a second set of PRBs for the second UPRG, at 706. A number of PRBs included in the first set of PRBs and the second set of PRBs is based on a UPRG bundle size. For example, the UE 115 may send the SRS 502 or the PUSCH signal 504 to the base station 105. In one example, the UPRG bundle size corresponds to two, and each UPRG includes two of the PRBs 402a-m. In another example, the UPRG bundle size corresponds to four, and each UPRG includes four of the PRBs 402a-m. In other examples, the UPRG bundle size may correspond to another value.

In some examples, the method 700 further includes aligning the uplink transmission with a second uplink transmission and sending a second uplink transmission to the base station 105. Aligning the uplink transmission with the second uplink transmission may include applying, at one or more common blocks of the uplink transmission and the second uplink transmission, the same pre-coding to the second uplink transmission as the uplink transmission, the one or more common blocks determined based on pre-coding of the uplink transmission. For example, the uplink transmission may include the SRS 502, and the second uplink transmission may include the PUSCH signal 504 aligned with the SRS 502. In another example, the uplink transmission includes the PUSCH signal 504, and the second uplink transmission may include the SRS 502 aligned with the PUSCH signal 504. The second uplink transmission may be a second MIMO uplink transmission.

Figure 8:
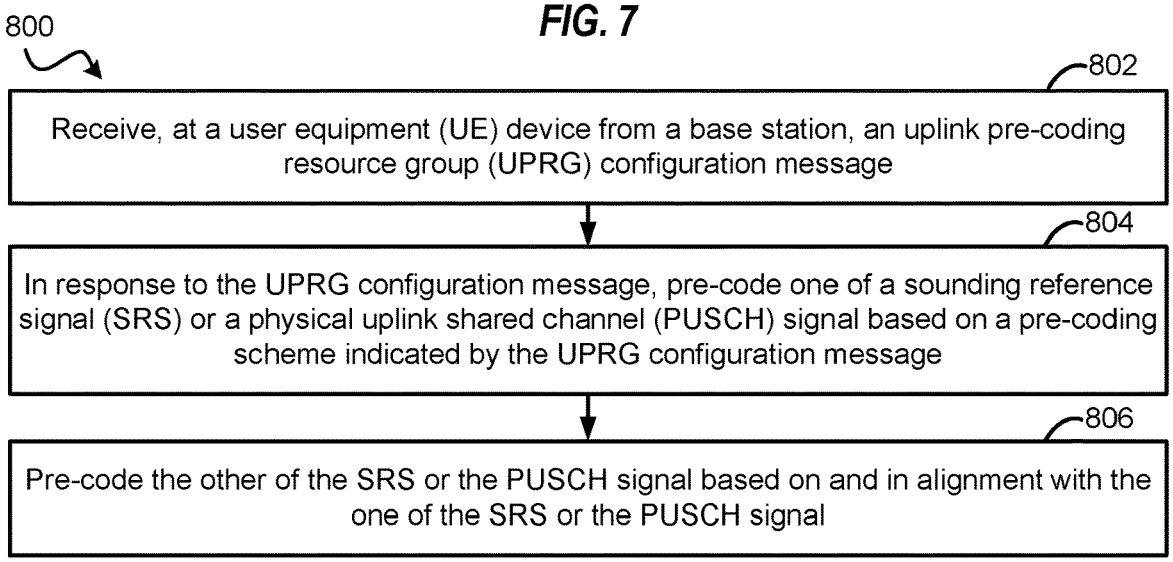
FIG. 8 is a flow chart of another method of wireless communication by a UE to perform UPRG based wireless communications in accordance with some aspects of the disclosure.

Referring to FIG. 8, another example of a method of wireless communication is depicted and generally designated 800. In some examples, operations of the method 800 are performed by the UE 115.

The method 800 includes receiving, at a user equipment (UE) device from a base station, an uplink pre-coding resource group (UPRG) configuration message, at 802. For example, the UE 115 may receive the UPRG configuration message 618 from the base station 105.

The method 800 further includes, in response to the UPRG configuration message, pre-coding one of a sounding reference signal (SRS) or a physical uplink shared channel (PUSCH) signal based on a pre-coding scheme indicated by the UPRG configuration message, at 804. For example, the UE 115 may pre-code the SRS 502 or the PUSCH signal 504 based on a UPRG bundle size indicated by the UPRG configuration message 618.

The method 800 further includes pre-coding the other of the SRS or the PUSCH signal based on and in alignment with the one of the SRS or the PUSCH signal, at 806. For example, in response to pre-coding the SRS 502, the UE 115 may pre-code the PUSCH signal 504 based on and in alignment with the SRS 502. As another example, in response to pre-coding the PUSCH signal 504, the UE 115 may pre-code the SRS 502 based on and in alignment with the PUSCH signal 504.

Figure 9:
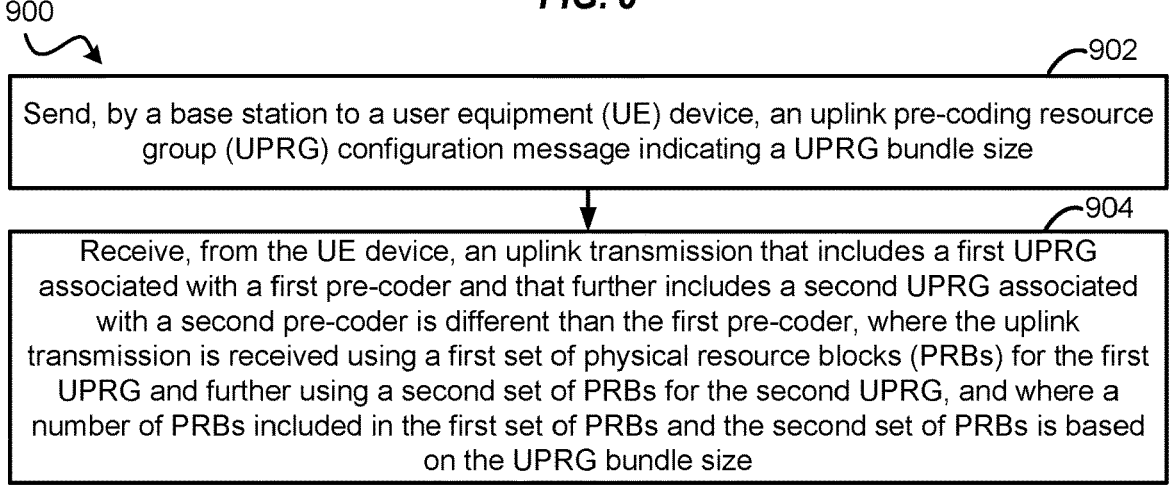
FIG. 9 is a flow chart of a method of wireless communication by a base station to perform UPRG based wireless communications in accordance with some aspects of the disclosure.

Referring to FIG. 9, another example of a method of wireless communication is depicted and generally designated 900. In some examples, operations of the method 900 are performed by the base station 105.

The method 900 includes sending, by a base station to a UE device, a UPRG configuration message indicating a UPRG bundle size, at 902. For example, the base station 105 may send to the UE 115 the UPRG configuration message 618 to indicate the UPRG bundle size.

The method 900 further includes receiving, from the UE device, an uplink transmission that includes a first UPRG associated with a first pre-coder and that further includes a second UPRG associated with a second pre-coder is different than the first pre-coder, at 904. The uplink transmission is received using a first set of physical resource blocks (PRBs) for the first UPRG and further using a second set of PRBs for the second UPRG, and a number of PRBs included in the first set of PRBs and the second set of PRBs is based on the UPRG bundle size. In one example, the UPRG bundle size corresponds to two, and each UPRG includes two of the PRBs 402a-m. In another example, the UPRG bundle size corresponds to four, and each UPRG includes four of the PRBs 402a-m. In other examples, the UPRG bundle size may correspond to another value.

In some examples, the method 900 further includes determining the UPRG bundle size based on one or more criteria. For example, the base station 105 may be configured to determine the UPRG bundle size based on the pre-coding gain 670, the channel estimation quality 672, or a combination thereof.

Figure 10:
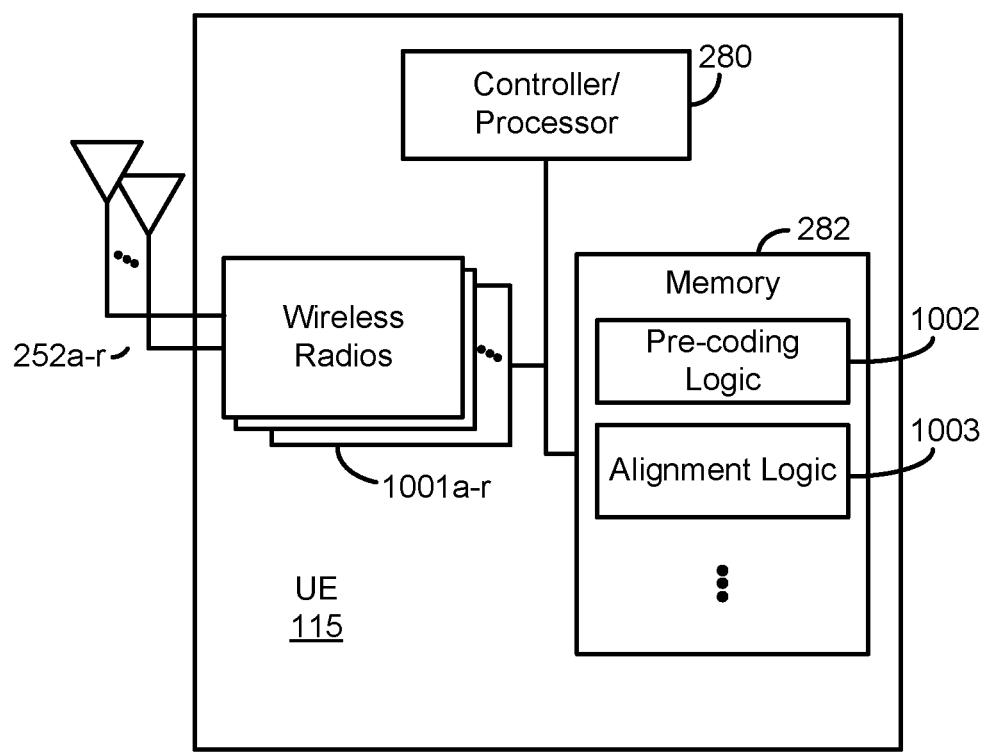
FIG. 10 is a block diagram illustrating certain aspects of an example of a UE configured to perform UPRG based wireless communications in accordance with some aspects of the disclosure.

FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r include various components and hardware, as illustrated in FIG. 2 for UE 115, including modulator/demodulators 254a-r, MIMO detector 256, receive processor 258, transmit processor 264, and TX MIMO processor 266.

Memory 282 is configured to store instructions, data, or other information to enable UPRG based wireless communications. For example, memory 282 may store pre-coding logic 1002 executable by the controller/processor 280 to pre-code information according to one or more techniques described herein. Alternatively or in addition, pre-coding logic 1002 may be executable by one or more components of the wireless radios 1001a-r (e.g., by transmit processor 264) to pre-code information according to one or more techniques described herein.

Memory 282 may also be configured to store alignment logic 1003 executable by controller/processor 280 or by one or more components of the wireless radios 1001a-r (e.g., by transmit processor 264) to align transmissions. For example, the alignment logic 1003 may be executable to align the PUSCH signal 504 with the SRS 502 so that one or more PRBs common to the PUSCH signal 504 and the SRS 502 receive the same pre-coding. Alternatively or in addition, the alignment logic 1003 may be executable to align the SRS 502 with the PUSCH signal 504 so that one or more PRBs common to the PUSCH signal 504 and the SRS 502 receive the same pre-coding.

Figure 11:
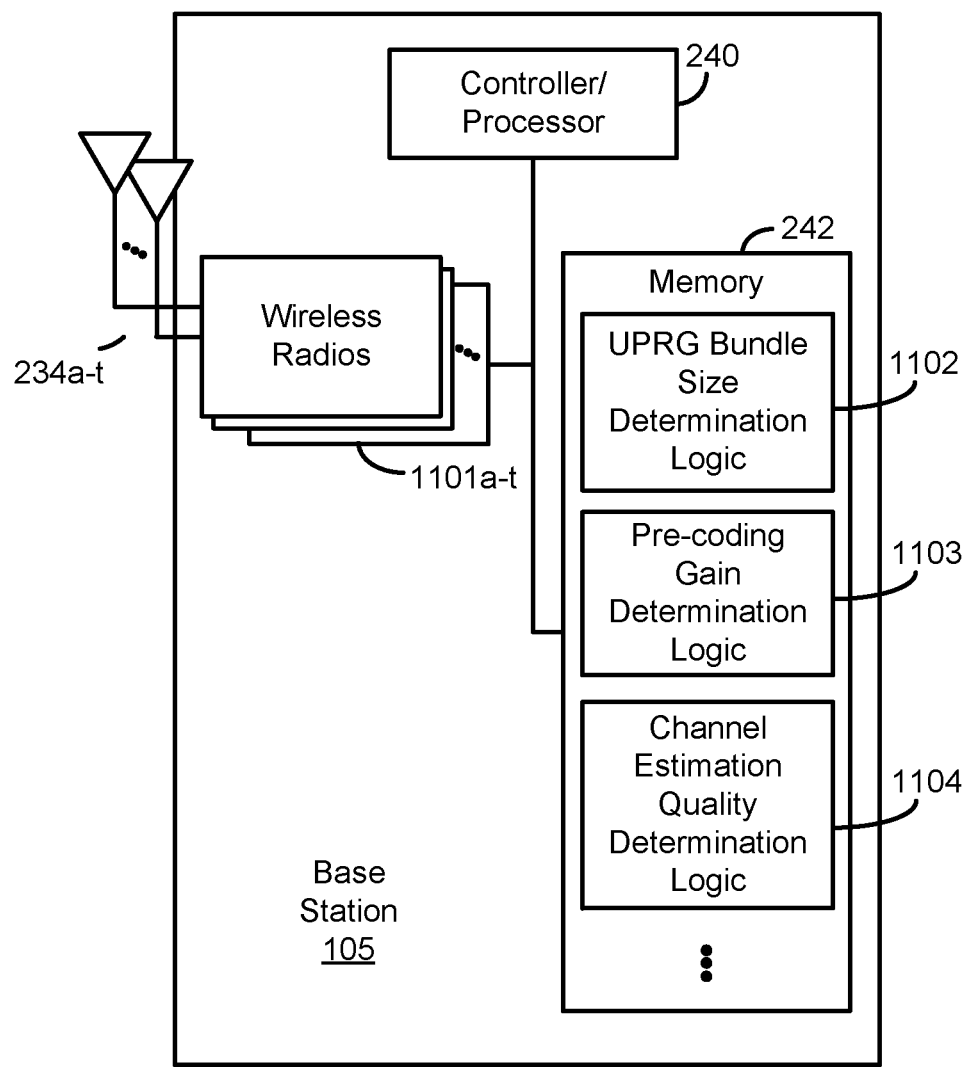
FIG. 11 is a block diagram illustrating certain aspects of an example of a base station configured to perform UPRG based wireless communications in accordance with some aspects of the disclosure.

FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1101a-t and antennas 234a-t. Wireless radios 1101a-t includes various components and hardware, as illustrated in FIG. 2 for base station 105, including modulator/demodulators 232a-t, MIMO detector 236, receive processor 238, transmit processor 220, and TX MIMO processor 230.

Memory 242 is configured to store instructions, data, or other information to enable UPRG based wireless communications. For example, memory 242 may store UPRG bundle size determination logic 1102 executable by the controller/processor 240 to determine a UPRG bundle size (e.g., based on the pre-coding gain 670, the channel estimation quality 672, or both). To further illustrate, memory 242 may store pre-coding gain determination logic 1103 executable by the controller/processor 240 to determine the pre-coding gain 670 and to determine whether the pre-coding gain 670 is sufficient for a particular communication application (e.g., based on whether the pre-coding gain 670 satisfies a threshold). Further, memory 242 may store channel estimation quality determination logic 1104 executable by the controller/processor 240 to determine the channel estimation quality 672 (e.g., by determining a number of bit errors in a received signal after decoding or demodulating the received signal using a channel estimate based on the SRS 502, or based on a number non-acknowledgement (NACK) messages sent by the base station 105 to the UE 115). The channel estimation quality determination logic 1104 may be executable by the controller/processor 240 to compare the channel estimation quality 672 to a threshold to determine whether the channel estimation quality 672 is sufficient for a particular communication application (e.g., based on whether the pre-coding gain 670 satisfies the threshold).

According to some further aspects, in a first aspect, an apparatus for wireless communication includes a memory and one or more processors coupled to the memory. The one or more processors are configured to determine a plurality of pre-coders available for uplink transmissions and to select a particular pre-coder from among the plurality of pre-coders. The one or more processors are configured to initiate encoding of an uplink signal based on the particular pre-coder to generate a pre-coded uplink signal and to initiate transmission of the pre-coded uplink signal. The pre-coded uplink signal has one or more characteristics that enable a base station to identify the particular pre-coder.

In a second aspect alternatively or in addition to the first aspect, the one or more characteristics implicitly indicate the particular pre-coder to the base station without use of an explicit indication of the particular pre-coder.

In a third aspect alternatively or in addition to one or more of the first through second aspects, the apparatus further includes a plurality of ports configured to transmit the pre-coded uplink signal, and the one or more characteristics include a mapping of a plurality of power levels to the plurality of ports.

In a fourth aspect alternatively or in addition to one or more of the first through third aspects, the one or more processors are further configured to determine the plurality of pre-coders based on a message received from the base station and indicating the plurality of pre-coders.

In a fifth aspect alternatively or in addition to one or more of the first through fourth aspects, the message corresponds to an RRC configuration message.

In a sixth aspect alternatively or in addition to one or more of the first through fifth aspects, the message corresponds to a MAC-CE activation message.

In a seventh aspect alternatively or in addition to one or more of the first through sixth aspects, the one or more processors are further configured to initiate transmission, to the base station, of an indication of the plurality of pre-coders.

In an eighth aspect alternatively or in addition to one or more of the first through seventh aspects, the indication is included in a MAC-CE report message.

In a ninth aspect alternatively or in addition to one or more of the first through eighth aspects, the apparatus further includes a receiver configured to receive a CSI-RS from the base station, and the one or more processors are further configured to select the particular pre-coder from among the plurality of pre-coders based on the CSI-RS.

In a tenth aspect alternatively or in addition to one or more of the first through ninth aspects, the apparatus further includes a plurality of ports and transmit circuitry configured to apply a first power level to a first port of the plurality of ports based on a first bit value of the particular pre-coder and to apply a second power level to a second port of the plurality of ports based on a second bit of the particular pre-coder.

In an eleventh aspect alternatively or in addition to one or more of the first through tenth aspects, the pre-coded uplink signal corresponds to an SRS.

In a twelfth aspect alternatively or in addition to one or more of the first through eleventh aspects, the pre-coded uplink signal corresponds to a PUSCH signal.

In a thirteenth aspect alternatively or in addition to one or more of the first through twelfth aspects, the apparatus further includes a plurality of antennas and a transmitter coupled to the plurality of antennas and configured to transmit the pre-coded uplink signal using a subset of the plurality of antennas, wherein the one or more characteristics enable the base station to identify the particular pre-coder in connection with transmission of the pre-coded uplink signal using the subset of the plurality of antennas.

In a fourteenth aspect alternatively or in addition to one or more of the first through thirteenth aspects, a method of wireless communication performed by a UE includes determining a plurality of pre-coders available for uplink transmissions. The method further includes selecting a particular pre-coder from among the plurality of pre-coders, encoding an uplink signal based on the particular pre-coder to generate a pre-coded uplink signal, and transmitting the pre-coded uplink signal. The pre-coded uplink signal has one or more characteristics that enable a base station to identify the particular pre-coder.

In a fifteenth aspect alternatively or in addition to one or more of the first through fourteenth aspects, the one or more characteristics implicitly indicate the particular pre-coder to the base station without use of an explicit indication of the particular pre-coder.

In a sixteenth aspect alternatively or in addition to one or more of the first through fifteenth aspects, the pre-coded uplink signal is transmitted via a plurality of ports of the UE, and the one or more characteristics include a mapping of a plurality of power levels to the plurality of ports of the UE.

In a seventeenth aspect alternatively or in addition to one or more of the first through sixteenth aspects, an apparatus for wireless communication includes a memory and one or more processors coupled to the memory. The one or more processors are configured to receive, from a UE, a pre-coded uplink signal. The one or more processors are further configured to identify, based on one or more characteristics of the pre-coded uplink signal and from a plurality of pre-coders associated with uplink transmissions, a particular pre-coder used to pre-code the uplink signal. The one or more processors are further configured to initiate decoding of the pre-coded uplink signal based on the particular pre-coder.

In an eighteenth aspect alternatively or in addition to one or more of the first through seventeenth aspects, the one or more characteristics implicitly indicate the particular pre-coder without use of an explicit indication of the particular pre-coder.

In a nineteenth aspect alternatively or in addition to one or more of the first through eighteenth aspects, the pre-coded uplink signal is transmitted via a plurality of ports of the UE, and the one or more characteristics include a mapping of a plurality of power levels to the plurality of ports of the UE.

In a twentieth aspect alternatively or in addition to one or more of the first through nineteenth aspects, the apparatus further includes a transmitter configured to transmit, to the UE, a message indicating the plurality of pre-coders.

In a twenty-first aspect alternatively or in addition to one or more of the first through twentieth aspects, the message corresponds to an RRC configuration message.

In a twenty-second aspect alternatively or in addition to one or more of the first through twenty-first aspects, the message corresponds to a MAC-CE activation message.

In a twenty-third aspect alternatively or in addition to one or more of the first through twenty-second aspects, the apparatus further includes a receiver configured to receive, from the UE, an indication of the plurality of pre-coders.

In a twenty-fourth aspect alternatively or in addition to one or more of the first through twenty-third aspects, the indication is included in a MAC-CE report message.

In a twenty-fifth aspect alternatively or in addition to one or more of the first through twenty-fourth aspects, the apparatus further includes a transmitter configured to transmit a CSI-RS to the UE, and the UE selects the particular pre-coder from among the plurality of pre-coders based on the CSI-RS.

In a twenty-sixth aspect alternatively or in addition to one or more of the first through twenty-fifth aspects, the pre-coded uplink signal corresponds to an SRS.

In a twenty-seventh aspect alternatively or in addition to one or more of the first through twenty-sixth aspects, the pre-coded uplink signal corresponds to a PUSCH signal.

In a twenty-eighth aspect alternatively or in addition to one or more of the first through twenty-seventh aspects, the UE includes a plurality of antennas, the pre-coded uplink signal is transmitted using a subset of the plurality of antennas, and the one or more characteristics enable identification of the particular pre-coder in connection with transmission of the pre-coded uplink signal using the subset of the plurality of antennas.

In a twenty-ninth aspect alternatively or in addition to one or more of the first through twenty-eighth aspects, a method of wireless communication performed by a base station includes receiving, from a UE, a pre-coded uplink signal. The method further includes, based on one or more characteristics of the pre-coded uplink signal, identifying, from a plurality of pre-coders associated with uplink transmissions, a particular pre-coder used to pre-code the uplink signal. The method further includes, based on the particular pre-coder, decoding the pre-coded uplink signal.

In a thirtieth aspect alternatively or in addition to one or more of the first through twenty-ninth aspects, the one or more characteristics implicitly indicate the particular pre-coder to the base station without use of an explicit indication of the particular pre-coder, the pre-coded uplink signal is transmitted via a plurality of ports of the UE, and the one or more characteristics include a mapping of a plurality of power levels to the plurality of ports of the UE.

In an example, an apparatus (e.g., the UE 115) includes means (e.g., the controller/processor 280) for pre-coding first information based on a first pre-coder of a pre-coding scheme to generate a first UPRG of an uplink transmission and for pre-coding second information based on a second pre-coder of the pre-coding scheme to generate a second UPRG of the uplink transmission. The second pre-coder is different than the first pre-coder. The apparatus further includes means (e.g., any of the wireless radios 1001a-r) for sending, to a base station (e.g., the base station 105), the uplink transmission using a first set of PRBs for the first UPRG and further using a second set of PRBs for the second UPRG. A number of PRBs included in the first set of PRBs and the second set of PRBs is based on a UPRG bundle size.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus for wireless communication, the apparatus comprising:
   one or more processors;
   memory coupled with the one or more processors; and
   instructions stored in the memory and executable by the one or more processors, individually or collectively, to cause the apparatus to:
   select a particular pre-coder from among a plurality of pre-coders;
   initiate encoding of an uplink signal in accordance with the particular pre-coder to generate a pre-coded uplink signal, wherein the pre-coded uplink signal has one or more characteristics that enable a network node to identify the particular pre-coder; and
   initiate transmission of the pre-coded uplink signal, wherein the one or more characteristics include one or more of a transmit power level associated with the encoded uplink signal, a transmit antenna associated with the encoded uplink signal, or a transmit port associated with the encoded uplink signal.

2. The apparatus of claim 1, wherein the one or more characteristics implicitly indicate the particular pre-coder to the network node without use of an explicit indication of the particular pre-coder.

3. The apparatus of claim 1, further comprising a plurality of ports configured to transmit the pre-coded uplink signal, wherein the plurality of ports include the transmit port, and wherein the one or more characteristics include a mapping of a plurality of power levels including the transmit power level to the plurality of ports.

4. The apparatus of claim 1, wherein the one or more processors are further configured to determine the plurality of pre-coders in accordance with a message received from the network node and indicating the plurality of pre-coders.

5. The apparatus of claim 4, wherein the message corresponds to a radio resource control (RRC) configuration message.

6. The apparatus of claim 4, wherein the message corresponds to a medium access control (MAC) control element (MAC-CE) activation message.

7. The apparatus of claim 1, wherein the one or more processors are further configured to initiate transmission, to the network node, of an indication of the plurality of pre-coders.

8. The apparatus of claim 7, wherein the indication is included in a medium access control (MAC) control element (MAC-CE) report message.

9. The apparatus of claim 1, further comprising a receiver configured to receive a channel state information (CSI) reference signal (CSI-RS) from the network node, wherein the one or more processors are further configured to select the particular pre-coder from among the plurality of pre-coders in accordance with the CSI-RS.

10. The apparatus of claim 1, further comprising:
    a plurality of ports including the transmit port; and
    transmit circuitry configured to apply a first power level to a first port of the plurality of ports in accordance with a first bit value of the particular pre-coder and to apply a second power level to a second port of the plurality of ports in accordance with a second bit of the particular pre-coder, wherein the transmit power level corresponds to one of the first power level or the second power level, and wherein the transmit port corresponds to one of the first port or the second port.

11. The apparatus of claim 1, wherein the pre-coded uplink signal corresponds to a sounding reference signal (SRS).

12. The apparatus of claim 1, wherein the pre-coded uplink signal corresponds to a physical uplink shared channel (PUSCH) signal.

13. The apparatus of claim 1, further comprising:
    a plurality of antennas including the transmit antenna; and
    a transmitter coupled to the plurality of antennas and configured to transmit the pre-coded uplink signal using a subset of the plurality of antennas, wherein the one or more characteristics enable the network node to identify the particular pre-coder in connection with transmission of the pre-coded uplink signal using the subset of the plurality of antennas.

14. A method of wireless communication performed by a user equipment (UE), the method comprising:
selecting a particular pre-coder from among a plurality of pre-coders;
encoding an uplink signal in accordance with the particular pre-coder to generate a pre-coded uplink signal, wherein the pre-coded uplink signal has one or more characteristics that enable a network node to identify the particular pre-coder; and
transmitting the pre-coded uplink signal, wherein the one or more characteristics include one or more of a transmit power level associated with the encoded uplink signal, a transmit antenna associated with the encoded uplink signal, or a transmit port associated with the encoded uplink signal.

15. The method of claim 14, wherein the one or more characteristics implicitly indicate the particular pre-coder to the network node without use of an explicit indication of the particular pre-coder.

16. The method of claim 14, wherein the pre-coded uplink signal is transmitted via a plurality of ports of the UE, wherein the plurality of ports include the transmit port, and wherein the one or more characteristics include a mapping of a plurality of power levels including the transmit power level to the plurality of ports of the UE.

17. The method of claim 14, further comprising receiving, from the network node, a message indicating a quantity of consecutive physical resource blocks (PRBs) of the uplink signal to which particular pre-coder is to be applied, wherein the uplink signal is encoded further in accordance with the quantity.

18. The method of claim 14, wherein the one or more characteristics include one or more of a plurality of transmit power levels associated with the encoded uplink signal and including the transmit power level, a plurality of transmit antennas associated with the encoded uplink signal and including the transmit antenna, or a plurality of transmit ports associated with the encoded uplink signal and including the transmit port.

19. An apparatus for wireless communication, the apparatus comprising:
one or more processors;
memory coupled with the one or more processors; and
instructions stored in the memory and executable by the one or more processors, individually or collectively, to cause the apparatus to:
receive, from a user equipment (UE), a pre-coded uplink signal;
in accordance with one or more characteristics of the pre-coded uplink signal, identify, from a plurality of pre-coders associated with uplink transmissions, a particular pre-coder used to generate the pre-coded uplink signal, wherein the one or more characteristics include one or more of a transmit power level associated with the encoded uplink signal, a transmit antenna associated with the encoded uplink signal, or a transmit port associated with the encoded uplink signal; and
in accordance with the particular pre-coder, initiate decoding of the pre-coded uplink signal.

20. The apparatus of claim 19, wherein the one or more characteristics implicitly indicate the particular pre-coder without use of an explicit indication of the particular pre-coder.

21. The apparatus of claim 19, wherein the pre-coded uplink signal is transmitted via a plurality of ports of the UE, wherein the plurality of ports include the transmit port, and wherein the one or more characteristics include a mapping of a plurality of power levels including the transmit power level to the plurality of ports of the UE.

22. The apparatus of claim 19, further comprising a transmitter configured to transmit, to the UE, a message indicating the plurality of pre-coders.

23. The apparatus of claim 19, further comprising a receiver configured to receive, from the UE, an indication of the plurality of pre-coders.

24. The apparatus of claim 19, further comprising a transmitter configured to transmit a channel state information (CSI) reference signal (CSI-RS) to the UE, wherein the UE selects the particular pre-coder from among the plurality of pre-coders in accordance with the CSI-RS.

25. The apparatus of claim 19, wherein the pre-coded uplink signal corresponds to a sounding reference signal (SRS).

26. The apparatus of claim 19, wherein the pre-coded uplink signal corresponds to a physical uplink shared channel (PUSCH) signal.

27. The apparatus of claim 19, wherein the UE includes a plurality of antennas including the transmit antenna, wherein the pre-coded uplink signal is transmitted using a subset of the plurality of antennas, and wherein the one or more characteristics enable identification of the particular pre-coder in connection with transmission of the pre-coded uplink signal using the subset of the plurality of antennas.

28. A method of wireless communication performed by a network node, the method comprising:
receiving, from a user equipment (UE), a pre-coded uplink signal;
in accordance with one or more characteristics of the pre-coded uplink signal, identifying, from a plurality of pre-coders associated with uplink transmissions, a particular pre-coder used to generate the pre-coded uplink signal, wherein the one or more characteristics include one or more of a transmit power level associated with the encoded uplink signal, a transmit antenna associated with the encoded uplink signal, or a transmit port associated with the encoded uplink signal; and
in accordance with the particular pre-coder, decoding the pre-coded uplink signal.

29. The method of claim 28, wherein the one or more characteristics implicitly indicate the particular pre-coder to the network node without use of an explicit indication of the particular pre-coder, wherein the pre-coded uplink signal is transmitted via a plurality of ports of the UE, wherein the plurality of ports include the transmit port and wherein the one or more characteristics include a mapping of a plurality of power levels including the transmit power level to the plurality of ports of the UE.

* * * * *